United States Patent
Sinha et al.

(10) Patent No.: US 7,463,550 B2
(45) Date of Patent: Dec. 9, 2008

(54) STONELEY RADIAL PROFILING OF FORMATION SHEAR SLOWNESS

(75) Inventors: Bikash K. Sinha, West Redding, CT (US); Jahir Pabon, Wellesley, MA (US); Mare Yamamoto, Sendai (JP)

(73) Assignee: Schlumberger Technology Corporation, Ridgefield, CT (US)

( * ) Notice: Subject to any disclaimer, the term of this patent is extended or adjusted under 35 U.S.C. 154(b) by 138 days.

(21) Appl. No.: 11/125,634

(22) Filed: May 10, 2005

(65) Prior Publication Data

US 2006/0256656 A1 Nov. 16, 2006

(51) Int. Cl.
- *G01V 1/48* (2006.01)
- *G01V 1/50* (2006.01)
- *G01V 1/52* (2006.01)

(52) U.S. Cl. ............... 367/25; 367/31; 367/32
(58) Field of Classification Search ............ 367/25, 367/31, 32, 75; 702/6, 18
See application file for complete search history.

(56) References Cited

U.S. PATENT DOCUMENTS

| | | | | |
|---|---|---|---|---|
| 4,633,449 | A * | 12/1986 | Ingram et al. | 367/75 |
| 6,611,761 | B2 | 8/2003 | Sinha et al. | 702/6 |
| 6,714,480 | B2 | 3/2004 | Sinha et al. | 367/31 |
| 2004/0001389 | A1 * | 1/2004 | Tang | 367/31 |
| 2004/0257911 | A1 * | 12/2004 | Tang et al. | 367/81 |

FOREIGN PATENT DOCUMENTS

| GB | 2418734 A | 4/2006 |
|---|---|---|
| WO | 2004/003590 A1 | 1/2004 |

OTHER PUBLICATIONS

Tang, Xiaoming. "Determining formation shear-wave transverse isotropy from borehole Stoneley-wave measurements." Geophysics, vol. 68 (Jan.-Feb. 2003).*
Cheng, et al. "Elastic wave propagation in a fluid-filled borehole and synthetic acoustic logs." Geophysics, vol. 46 (Jul. 1981).*
Geertis, et al. "The effect of tool on dipole logging." SEG Technical Program Expanded Abstracts—1997—pp. 313-316.*
Tang, X.M. "Determining shear-wave transverse isotropy from borehole stoneley waves." SEG Meeting, Sep. 2001.*
Ellefsen, et al. "Estimating a shear modulus of a transversely isotrpic rock." 1991 Ultrasonics Symposium.*
Ellefsen, et al. "Elastic wave propagation along a borehole in an anisotropic medium."*

(Continued)

*Primary Examiner*—Jack W. Keith
*Assistant Examiner*—Scott A Hughes
(74) *Attorney, Agent, or Firm*—Jody Lynn DeStefanis; Vincent Loccisano; James McAleenan

(57) ABSTRACT

Methods and apparatus facilitating radial profiling of shear slowness or shear modulus $c_{66}$ in the cross-sectional plane of a borehole in an anisotropic formation with the vertical $X_3$-axis are disclosed. According to some aspects of the invention, sonic tool bias is accounted for and removed from radial profiles. According to some aspects, sonic tool bias is accounted for by modeling the sonic tool as a heavy-fluid.

6 Claims, 13 Drawing Sheets

OTHER PUBLICATIONS

Norris, A.N. "The speed of a tube wave." *J. Acoust. Soc. Am.*, 87, Jan. 1990.*

Tang, et al. "Effects of a logging tool on the Stoneley waves in elastic and porous boreholes." *The Log Analyst*, Sep.-Oct. 1993.*

Sinha, et al. "Radial Profiling of Formation Shear Velocity from Borehole Flexural Dispersions." 2001 IEEE Ultrasonics Symposium.*

Backus, G. and F. Gilbert. "Uniqueness In the Inversion of Inaccurate Gross Earth Data." *Phil. Trans. Roy. Soc.* (London), A266. (1970): pp. 123-192.

Burridge, R. and B. Sinha. "Inversion For Formation Shear Modulus And Radial Depth Of Investigation Using Borehole Flexural Waves." 66th Ann. International Meeting, Society of Exploration Geophysicists. Expanded Abstracts. (1996): pp. 158-161.

Ekstrom, M.P. "Dispersion estimation from borehole acoustic arrays using a modified matrix pencil algorithm." Presented at the 29th Asilomar Conference on Signals, Systems and Computers, 1995.

Harrison et al. "Acquisition and Analysis of Sonic Waveforms From a Borehole Monopole and Dipole Source For The Determination of Compressional And Shear Speeds And Their Relation to Rock Mechanical Properties and Surface Seismic Data." *Society of Petroleum Engineers* SPE 20557, 1990.

Hsu, C.J. and B.K. Sinha. "Mandrel effects on the dipole flexural mode in a borehole." *Journal of Acoustical Society of America* vol. 104(4) (Oct. 1998): pp. 2025-2039.

Sinha, B.K. "Sensitivity and inversion of borehole flexural dispersions for formation parameters." *Geophysical Journal International* vol. 128 (1997): pp. 84-96.

* cited by examiner

STONELEY RADIAL PROFILING OF FORMATION SHEAR SLOWNESS

FIELD OF THE INVENTION

The present invention relates generally to sonic or acoustic logging of earth formations surrounding a borehole. More particularly, the present invention relates to methods and apparatus for determining radial variations in shear slowness of formations surrounding a borehole.

BACKGROUND OF THE INVENTION

It is well known that mechanical disturbances can be used to establish elastic waves in earth formations surrounding a borehole, and the properties of these waves can be measured to obtain important information about the formations through which the waves have propagated. Parameters of compressional, shear and Stoneley waves can be indicators of formation characteristics. In particular, wave velocity (or its reciprocal, slowness) helps in evaluation of the location and/or producibility of hydrocarbon resources.

One example of a logging device that has been used to obtain and analyze acoustic measurements of formations surrounding an earth borehole is a Dipole Shear Sonic Imager ("DSI"—trademark of Schlumberger), and is of the general type described in Harrison et al., "Acquisition and Analysis of Sonic Waveforms From a Borehole Monopole And Dipole Source For The Determination Of Compressional And Shear Speeds And Their Relation To Rock Mechanical Properties And Surface Seismic Data," Society of Petroleum Engineers, SPE 20557, 1990. According to conventional use of the DSI logging tool, one can present compressional slowness, $\Delta t_c$, shear slowness, $\Delta t_s$, and Stoneley slowness, $\Delta t_{st}$, each as a function of depth, z (slowness corresponds to an interval wave transit time typically measured by sonic logging tools).

An acoustic source in a fluid-filled borehole generates headwaves, as well as relatively stronger borehole-guided modes. A standard sonic measurement system includes a piezoelectric source and hydrophone receivers inside a fluid-filled borehole. The piezoelectric source may be either a monopole or a dipole source. The source bandwidth typically ranges from a 0.5 to 20 kHz. A monopole source primarily generates the lowest-order axisymmetric mode, also referred to as the Stoneley mode, along with compressional and shear headwaves. In contrast, a dipole source primarily excites the lowest-order flexural borehole mode together with compressional and shear headwaves. The headwaves are caused by the coupling of the transmitted acoustic energy to plane waves in the formation that propagate along the borehole axis. An incident compressional wave in the borehole fluid produces critically refracted compressional waves in the formation. The waves refracted along the borehole surface are known as compressional headwaves. The critical incidence angle is represented as $\theta_i = \sin^{-1}(V_f/V_c)$, where $V_f$ is the compressional wave speed through the borehole fluid and $V_c$ is the compressional wave speed through the formation. As a compressional headwave travels along an interface, it radiates energy back into the fluid that can be detected by the hydrophone receivers placed in the fluid-filled borehole. In relatively fast formations, the shear headwave can be similarly excited by a compressional wave at the critical incidence angle $\theta_i = \sin^{-1}(V_f/V_s)$, where $V_s$ is the shear wave speed through the formation. It is also worth noting that headwaves are excited only when the wavelength of the incident wave is smaller than the borehole diameter so that the boundary can be effectively treated as a planar interface. In a homogeneous and isotropic model of fast formations, as above noted, compressional and shear headwaves can be generated by a monopole source placed in a fluid-filled borehole to determine the formation compressional and shear wave speeds. However, refracted shear headwaves cannot be detected for slow formations (where the shear wave velocity is less than the borehole-fluid compressional wave velocity) with receivers placed in the borehole fluid. Therefore, formation shear velocities are obtained from the low-frequency asymptote of flexural dispersion for slow formations. There are standard processing techniques for the estimation of formation shear velocities in either fast or slow formations from an array of recorded dipole waveforms.

Both the monopole and dipole waveforms recorded at an array of receivers can be processed by a modified matrix pencil algorithm that isolates non-dispersive and dispersive arrivals in the wave train. The compressional headwave velocity is the formation quasi-compressional qP-) wave velocity along the borehole axis. The zero-frequency intercept of the lowest-order axisymmetric Stoneley dispersion yields the tube wave velocity (VT) along the borehole axis. The formation quasi-shear (qSV-) and shear (SH-) velocities are obtained from the low-frequency asymptotes of the two orthogonally polarized borehole flexural waves propagating along the borehole axis.

Among the areas of interest of the present invention is the field of seismic prospecting. Seismic prospecting for hydrocarbon reserves requires estimates of all the five transversely isotropic (TI-) anisotropic constants of overburden shale for reliable identification and location of target reservoirs. Shale typically constitutes more than 70% of the formation that a borehole trajectory passes through before reaching the target reservoir. Consequently, if the proper anisotropic constants of shale are not accounted for in the velocity model, it is more probable that drilling based on seismic prospecting will miss the target reservoir.

Sedimentary rocks frequently possess an anisotropic structure resulting, for example, from thin bedding, fine scale layering, the presence of oriented microcracks or fractures, or the preferred orientation of nonspherical grains or anisotropic minerals. This type of anisotropy is called formation intrinsic anisotropy. A dipole dispersion crossover is an indicator of stress-induced anisotropy dominating any intrinsic anisotropy that may also be present.

Failure to properly account for anisotropy in seismic processing may lead to errors in velocity analysis, normal moveout (NMO) correction, dip moveout (DMO) correction, migration, time-to-depth conversion and amplitude versus offset (AVO) analysis. The main cause of anisotropy in sedimentary basins is the presence of shales which, as noted above, typically form a major component of the basin, and overlie many hydrocarbon reservoirs. Shales are anisotropic as a result of layering and a partial alignment of plate-like clay minerals. This anisotropy may be described, to a good approximation, as being transversely isotropic (TI). A TI medium is invariant with respect to rotations about a symmetry axis and may be described by five independent elastic stiffnesses. An example is a sedimentary rock for which the bedding plane is a plane of isotropy.

AVO analysis requires some combinations of formation anisotropic constants. Some of these constants can be obtained from the borehole sonic measurements, others can be obtained from borehole seismic measurements, such as walk-away vertical seismic profiles (VSPs). The elastic constants that can be obtained from the borehole sonic measurements are the three formation shear moduli and a compressional modulus from the compressional headwave logging.

Two of the shear moduli, known to those of skill in the art as $c_{44}$ and $c_{55}$, can be obtained from the fast and slow dipole flexural dispersions. A recently issued patent (U.S. Pat. No. 6,611,761 entitled "Sonic Well Logging for Radial Profiling," hereby incorporated by reference) describes a technique for obtaining radial profiles of fast and slow shear slownesses using measured dipole dispersions in two orthogonal directions that are characterized by the shear moduli $c_{44}$ and $c_{55}$ for a borehole parallel to an $X_3$-axis (FIG. 1) in an orthorhombic formation. However, the third shear modulus, known as $c_{66}$, is different. The third shear modulus can be estimated from tube wave velocity. The tube wave velocity is the zero-frequency intercept of borehole Stoneley dispersion.

Typical logging devices such as the DSI are generally quite flexible and therefore approximately "acoustically transparent." The advantage of typical flexible logging devices is the acoustic transparency, which allows any signal propagation through the tool to be ignored. Accordingly, typical sonic data is collected and processed independent of tool effects. However, the drawback of flexible logging devices is mechanical weakness. In difficult logging conditions, flexible logging devices may buckle or otherwise fail. Stronger tools may be useful for difficult logging conditions, but stronger logging tools affect the acoustic signals, and current logging procedures ignore any tool influence.

A U.S. Pat. No. 6,714,480, issued Mar. 30, 2004 and entitled "Determination of anisotropic moduli of earth formations" (hereby incorporated by reference) describes a technique for estimating the horizontal shear modulus $c_{66}$ of an orthorhombic or TI-formation using a zero frequency intercept of the Stoneley dispersion that yields tube wave velocity. This technique assumes that the borehole Stoneley dispersion is insignificantly affected by the presence of the sonic tool structure or any possible near-wellbore alteration, such as super-charging in a permeable formation, and shale swelling in overburden shales. Nevertheless, new observations reveal that especially in fast formations and small borehole diameters, both sonic tool effects and near-wellbore alteration can have significant effects on the measured Stoneley dispersion and cause a significant bias on the estimate of the horizontal shear modulus $c_{66}$.

SUMMARY OF THE INVENTION

The present invention addresses the above-described deficiencies and others. Specifically, the present invention provides methods and apparatus for radial profiling. The methods and apparatus facilitate removal of acoustic tool bias from the estimation of shear slowness moduli at different radial positions from the borehole surface.

One aspect of the invention provides a method of estimating a horizontal shear modulus $c_{66}$ in an anisotropic formation with a vertical $X_3$-axis surrounding a borehole. The method comprises measuring Stoneley dispersion with an acoustic tool, and calculating a horizontal shear modulus $c_{66}$ from the measured Stoneley dispersion using a process that accounds for the presence of the acoustic tool in the borehole. The accounting may include removing tool bias from the horizontal shear modulus $c_{66}$ calculation. In deviated boreholes, the present invention refers to inverting the measured Stoneley dispersion for estimating the effective $c_{66}$ in the cross-sectional plane of the borehole. The process that accounts for the presence of the acoustic tool may comprise modeling the acoustic tool as a heavy-fluid. The heavy-fluid model may comprise a generally cylindrical shape. The modeling of the acoustic tool as a heavy-fluid may comprise determining heavy-fluid compressional velocity as a function of borehole diameter and formation compressional velocity using a lookup table.

Another aspect of the invention provides a method of detecting and estimating mechanical alteration in a formation indicated by radial variations of horizontal shear slownesses around a borehole. The method comprises attributing heavy-fluid column properties equivalent to a logging tool, measuring or estimating borehole diameter, measuring or estimating borehole fluid compressional velocity, measuring or estimating formation mass bulk density and borehole fluid mass density for a depth interval, determining far-field formation compressional velocity, establishin Stoneley waves in the formation with the logging tool, estimating an initial guess of formation shear modulus $c_{66}$ using measured Stoneley velocity, calculating a reference shear velocity for an equivalent isotropic formation, determining heavy-fluid compressional velocity as a function of formation compressional velocity, calculating a reference Stoneley dispersion and associated eigenfunctions for an assumed homogeneous and equivalent isotropic formation, determining Stoneley wave velocity at a plurality of frequencies at each depth level of interest, creating measured Stoneley dispersion data at each depth level of interest, comparing measured Stoneley dispersion at a selected depth with the reference Stoneley dispersion. In the presence of a difference between the measured and reference Stoneley dispersions, selecting a plurality of Stoneley velocity data sets at the plurality of frequencies from the measured Stoneley dispersion, and calculating the radial profile of the horizontal shear modulus $c_{66}$ from the measured Stoneley dispersion data. The measuring or estimating of borehole fluid compressional velocity may comprise calculating borehole fluid compressional velocity based on the drilling mud composition, mass density, in-situ temperature, and pressure of the borehole fluid. The measuring or estimating of mud mass density may be calculated based on borehole fluid weight used at the depth interval of interest.

According to some aspects, the determining of the far-field formation compressional velocity comprises determining formation compressional velocity outside any mechanically altered annulus from a standard sonic log. The estimating of an initial guess of formation shear modulus $c_{66}$ may be done using the measured Stoneley velocity at the lowest measured frequency.

According to some aspects, the shear modulus $c_{66}$ is estimated by:

$$c_{66} = \frac{V_T^2 \rho_f V_f^2}{(V_f^2 - V_T^2)}$$

where $V_T$ is the measured Stoneley velocity at the lowest measured frequency;

$\rho_f$ is the borehole fluid mass density; and $V_f$ is the borehole fluid compressional velocity.

The calculating of a reference shear velocity for an equivalent isotropic formation may be found by taking the square root of the quotient of the shear modulus $c_{66}$ divided by formation mass bulk density. The calculating of a reference Stoneley dispersion and associated eigenfunctions for an assumed homogeneous and equivalent isotropic formation may comprise using the parameters: diameter of the borehole, borehole fluid compressional velocity, far field formation compressional velocity, reference shear velocity for an equivalent isotropic formation, ratio of formation mass bulk density versus borehole fluid mass density, diameter of the heavy-fluid column, heavy-fluid mass bulk density, and heavy-fluid compressional velocity. The plurality of frequencies may be separated sufficiently to ensure that velocity data is uncorrelated. For example, the plurality of frequencies may be separated by at least 200 Hz.

According to some aspects, the calculating of the radial profile further comprises calculating a selective number of corresponding axial wavenumbers, $k_i$, given by:

$$k_i = \frac{2\pi f_i}{V_i}$$

where $V_i$ is measured Stoneley velocity at frequency $f_i$.

According to some aspects, the calculating of the radial profile further comprises calculating fractional changes in the measured Stoneley velocities from the reference Stoneley dispersions for the selected axial wavenumbers, given by:

$$\frac{\Delta V_i}{V_i} = \frac{\left(V_i^{measured} - V_i^{reference}\right)}{V_i^{reference}}$$

where i=1, 2, ... n, n denoting the selective number of axial wavenumbers calculated.

According to some aspects, the calculating of the radial profile further comprises calculating a kernel, $G_i(r)$, at a selected axial wavenumber, $k_i$, in terms of the Stoneley eigenfunction according to the following equation:

$$\frac{\Delta V_i}{V_i} = \int_a^\infty G_i \frac{\Delta c_{66}(r)}{c_{66}} r \, dr$$

where r is radial position measured from the borehole axis, a is the borehole radius, and i=1, 2, ... ,n.

According to some aspects, the method further comprises calculating the integrals:

$$u_i = \int_a^\infty G_i(r) dr,$$

$$S_{ij}(r_0) = \int_a^\infty (r-r_0)^2 G_i(r) G_j(r) dr,$$

where S is radial spread, "a" denotes the borehole radius, and $r_o$ denotes the observation point at a radial position in the formation, and i,j=1, 2, ... , n.

The method may further comprise calculating:

$$a_i(r_o) = \frac{S_{ij}^{-1}(r_o) u_j}{u_i S_{ij}^{-1}(r_o) u_j}$$

where $a_i$ is the weighting coefficient of the data kernel $G_i(r)$ and $u_i$ is the integral of the data kernel $G_i(r)$ as shown above and denotes the sensitivity of the measured shear velocity $V_i^{measured}$ to radial variations in the shear modulus $c_{66}$.

According to some aspects, the calculating of the radial profile further comprises calculating fractional changes in the horizontal shear modulus $c_{66}$ from:

$$\frac{\Delta c_{66}(r_0)}{c_{66}} = a_i(r_0) \frac{\Delta V_i}{V_i}.$$

According to some aspects, the computation of the radial profile further comprises calculating radial variation of the horizontal shear modulus $c_{66}$ from:

$$c_{66}(r_0) = \left(1 + \frac{\Delta c_{66}(r_0)}{c_{66}}\right) c_{66}.$$

According to some aspects, the calculating of the radial profile further comprises calculating radial variation in the formation horizontal shear velocity from:

$$V_{hs}(r_0) = \left[\left(1 + \frac{\Delta c_{66}(r_0)}{c_{66}}\right) \frac{c_{66}}{\rho_b}\right]^{\frac{1}{2}}.$$

The method may further comprise calculating a trade-off parameter α, between error e, defined by:

$$e^2 = a_i(\alpha, r_0) E_{ij} a_j(\alpha, r_0)$$

and radial spread S, expressed as a new spread function W:

$$W_{ij}(\alpha, r_o) = E_{ij} + \alpha S_{ij}(r_o)$$

where $$a_i(\alpha, r_0) = \frac{W_{ij}^{-1}(r_0) u_i}{u_i W_{ij}^{-1}(r_0) u_i}, \text{ and}$$

$$S(\alpha, r_0) = a_i(\alpha, r_0) S_{ij}(r_0) a_j(\alpha, r_0).$$

The method may comprise calculating:

$$a_i(r_o) = \frac{W_{ij}^{-1}(r_o) u_j}{u_i W_{ij}^{-1}(r_o) u_j}$$

where $a_i$ and $u_i$ are defined above.

In a borehole radial profiling operation, comprising estimating of horizontal shear slowness, the present invention provides, according to one aspect, accounting for and removing tool bias related to the horizontal shear slowness.

One embodiment of the invention provides an apparatus for determining a radial profile of sonic shear velocity of formations surrounding a borehole. The apparatus comprises a logging tool, means for transmitting sonic energy from the logging tool to establish Stoneley waves in the formation, means for receiving, at the logging tool, sonic energy from the Stoneley waves, and for producing from the received sonic energy, measurement signals at a number of frequencies. The apparatus also provides means for determining, at each of the number of frequencies, the Stoneley wave velocity of the formation, means for deriving sonic compressional and shear velocities of the formation, and means for determining the radial profile of sonic shear velocity from the derived compressional and shear velocities of the formation, and the Stoneley wave velocities at a number of frequencies, accounting for logging tool bias in a calculation of horizontal shear velocity.

Another aspect of the invention provides a method of estimating effective shear modulus $c_{66}$ in a cross-sectional plane of a deviated borehole in an anisotropic formation with a known deviation with respect to a vertical $X_3$-axis. The method comprises measuring Stoneley dispersion in a deviated borehole with an acoustic tool, calculating an effective shear modulus $c_{66}$ in the cross-sectional plane of the borehole from the measured Stoneley dispersion using a process that accounts for the presence of the acoustic tool in the borehole. The accounting may include removing a tool bias from the effective shear modulus $c_{66}$ calculation.

Another aspect of the invention provides a method of estimating effective shear modulus $c_{66}$ in a cross-sectional plane of a horizontal borehole in an anisotropic formation with the borehole deviation substantially perpendicular to the vertical $X_3$-axis. The method comprises measuring Stoneley dispersion in a horizontal borehole with an acoustic tool, calculating an effective shear modulus $c_{66}$ in the cross-sectional plane of the borehole from the measured Stoneley dispersion using a process that accounts for the presence of the acoustic tool in the borehole. Again, the accounting may include removing a tool bias from the effective shear modulus $c_{66}$ calculation.

Additional advantages and novel features of the invention will be set forth in the description which follows or may be learned by those skilled in the art through reading these materials or practicing the invention. The advantages of the invention may be achieved through the means recited in the attached claims.

BRIEF DESCRIPTION OF THE DRAWINGS

The accompanying drawings illustrate preferred embodiments of the present invention and are a part of the specification. Together with the following description, the drawings demonstrate and explain the principles of the present invention.

Figure 1:
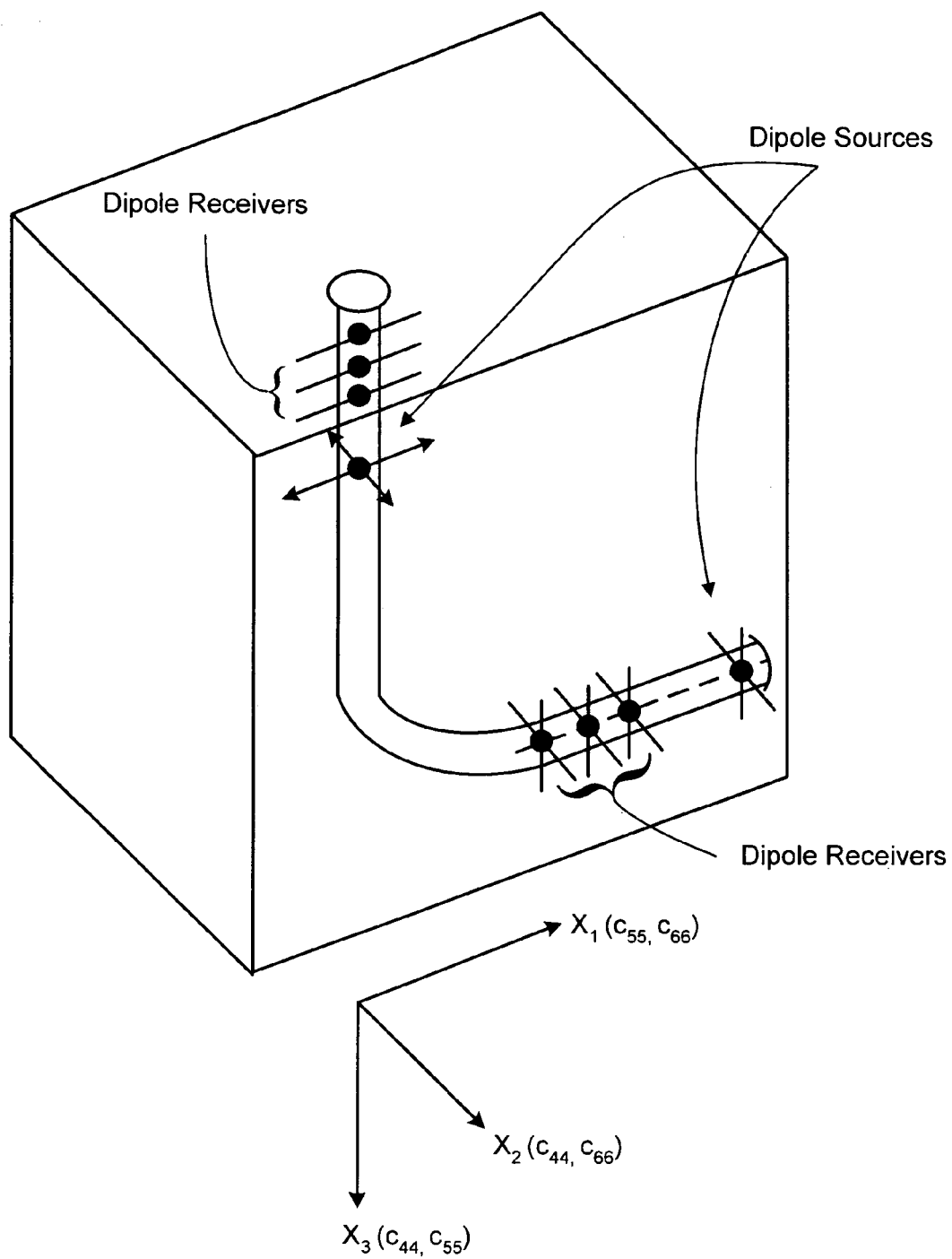
FIG. 1 is a schematic diagram of vertical and horizontal sections of a well, together with measurement axes.

Throughout the drawings, identical reference characters and descriptions indicate similar, but not necessarily identical elements. While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the scope of the invention as defined by the appended claims.

DETAILED DESCRIPTION OF THE PREFERRED EMBODIMENTS

Illustrative embodiments and aspects of the invention are described below. It will of course be appreciated that in the development of any such actual embodiment, numerous implementation-specific decisions must be made to achieve the developers' specific goals, such as compliance with system-related and business-related constraints, that will vary from one implementation to another. Moreover, it will be appreciated that such a development effort might be complex and time-consuming, but would nevertheless be a routine undertaking for those of ordinary skill in the art having the benefit of this disclosure.

The present invention contemplates methods and apparatus for radial profiling, and for estimating horizontal shear modulus from measured Stoneley dispersion in a vertical borehole. In deviated boreholes, the present invention refers to the inversion of measured Stoneley dispersions for estimating the effective shear modulus $c_{66}$ in the cross-sectional plane of the borehole. As discussed above, Stoneley dispersion is affected by the presence of a tool structure in the borehole as well as any other near-wellbore alterations. The principles of the present invention may include obtaining radial variation of the shear modulus $c_{66}$ (or equivalently, horizontal shear slowness) and estimating far-field shear slowness outside any possible near-wellbore altered annulus. The principles of the present invention also account for tool bias on the measured Stoneley dispersion. The shear modulus $c_{66}$ in the undisturbed formation may be used for AVO analysis. The radial extent of near-wellbore alteration can also be estimated in terms of radial variation of the shear modulus $c_{66}$ that can have applications in an optimal completion design for production as well as in determining a productivity index.

As used throughout the specification and claims, the terms "borehole" or "downhole" refer to a subterranean environment, particularly in a wellbore. The words "including" and "having," as used in the specification, including the claims, have the same meaning as the word "comprising."

Sedimentary rocks frequently possess an anisotropic structure resulting, for example, from thin bedding, fine scale layering, the presence of oriented microcracks or fractures of the preferred orientation of nonspherical grains, or anisotropic minerals. This type of anisotropy is called formation intrinsic anisotropy. A dipole dispersion crossover is an indicator of stress-induced anisotropy dominating any intrinsic anisotropy that may also be present.

As illustrated in FIG. 1, in an orthorhombic formation, the $X_3$-axis is assigned to be parallel to the borehole axis. The elastic constants, in reference to the borehole axes, take the form:

$$C = \begin{bmatrix} c_{11} & c_{12} & c_{13} & 0 & 0 & 0 \\ c_{12} & c_{22} & c_{23} & 0 & 0 & 0 \\ c_{13} & c_{23} & c_{33} & 0 & 0 & 0 \\ 0 & 0 & 0 & c_{44} & 0 & 0 \\ 0 & 0 & 0 & 0 & c_{55} & 0 \\ 0 & 0 & 0 & 0 & 0 & c_{66} \end{bmatrix}, \quad (1)$$

where the nine independent elastic moduli are $c_{11}$, $c_{12}$, $c_{13}$, $c_{22}$, $c_{23}$, $c_{33}$, $c_{44}$, $c_{55}$, and $c_{66}$.

Accurate and quantitative radial profiles of the three shear slownesses characterized by the shear moduli $c_{44}$, $c_{55}$, and $c_{66}$ in the three orthogonal coordinate planes are useful for the evaluation of formations for the presence and/or producibility of hydrocarbons. While methods and apparatus for obtaining the radial profiles of vertical shear moduli $c_{44}$ and $c_{55}$ using cross-dipole dispersions are described in the U.S. Pat. No. 6,611,761, the present invention provides methods and apparatus that address the need for radial profiles of $c_{66}$ and the associated shear slowness. FIG. 1 illustrates a schematic diagram of vertical and horizontal sections of a well together with the orthogonal principal measurement axes $X_1$, $X_2$, and $X_3$. $c_{44}$ and $c_{55}$ are the shear moduli that can be obtained from dipole shear logging in the borehole, whereas the shear modulus $c_{66}$ can be obtained from the monopole Stoneley logging in the same borehole.

Formations with two orthogonal fracture systems, or those subject to triaxial stresses (where the overburden $S_v$, maximum horizontal $S_{hmax}$, and minimum horizontal $S_{hmin}$ stresses are different), exhibit such an orthorhombic symmetry.

In the case of a TI-formation with its symmetric $X_3$-axis parallel to the borehole axis, $c_{11}=c_{22}$; $c_{13}=c_{23}$; $c_{44}=c_{55}$; and $c_{66}=(c_{11}-c_{12})/2$. Consequently, the number of independent elastic constants for a TI-formation reduces to five. Examples of TI-formations are those observed in prestressed formations where the horizontal stresses are the same and the overburden stress is different; or shaly formations with micro-layerings parallel to the $X_1$-$X_2$ plane.

The three shear moduli $c_{44}$, $c_{55}$, and $c_{66}$ in the undisturbed formation outside any near-wellbore altered annulus can be used to classify formation effective anisotropy as well as to estimate relative magnitudes of principal stresses. For example, the three anisotropic shear moduli can help identify: (1) Isotropic formations—characterized by $c_{44}=c_{55}=c_{66}$; (2) VTI formations (TI formations with vertical axis of symmetry)—characterized by $c_{44}=c_{55} \neq c_{66}$ ($X_3$-symmetry axis); (3) HTI formations (TI formations with horizontal axis of symmetry)—characterized by $c_{44} \neq c_{55}=c_{66}$ ($X_1$-symmetry axis); and (4) Orthorhombic formations—characterized by $c_{44} \neq c_{55} \neq c_{66}$. These shear moduli, together with associated formation anisotropy, are useful indicators of the existing formation fractures, layerings, and relative magnitudes of formation principal stresses. For instance, a VTI formation anisotropy in a vertical wellbore can be an indicator of horizontal fractures and layerings or formation stresses characterized by: $S_{Hmax}=S_{hmin} \neq S_V$, where $S_{Hmax}$, $S_{hmin}$, and $S_V$ are the maximum horizontal, minimum horizontal, and vertical stresses. Similarly, an HTI formation anisotropy in a vertical wellbore can be an indicator of vertical fractures and layerings or formation stresses characterized by: $S_V=S_{Hmax} \neq S_{hmin}$. An isotropic formation can be an indicator of isotropic formation stresses $S_V=S_{Hmax}=S_{hmin}$.

In contrast, an orthorhombic formation can be an indicator of two orthogonal fracture systems or formation stresses characterized by $S_V \neq S_{Hmax} \neq S_{hmin}$. In addition, an orthorhombic formation can be an indicator of aligned fractures or formation stresses obliquely oriented with respect to the borehole axes. The tangential compliance of a fractured formation and stress parameters of a prestressed formation can also be estimated from the three shear moduli. These moduli are also needed in the AVO analysis of seismic surveys of anisotropic formations.

According to principles of the present invention, there are procedures and apparatus for obtaining radial profiles of horizontal shear slowness and estimating a horizontal shear modulus $c_{66}$ outside any near-wellbore altered annulus. Therefore, the limitations of the prior art related to the estimation of horizontal shear modulus $c_{66}$ in the far-field of an orthorhombic or TI-formation with the TI-symmetry $X_3$-axis parallel to the borehole are reduced or overcome. The far-field shear modulus $c_{66}$ can be appropriately used in characterizing the formation orthorhombic or TI-anisotropy for subsequent application in the AVO-analysis.

Figure 2:
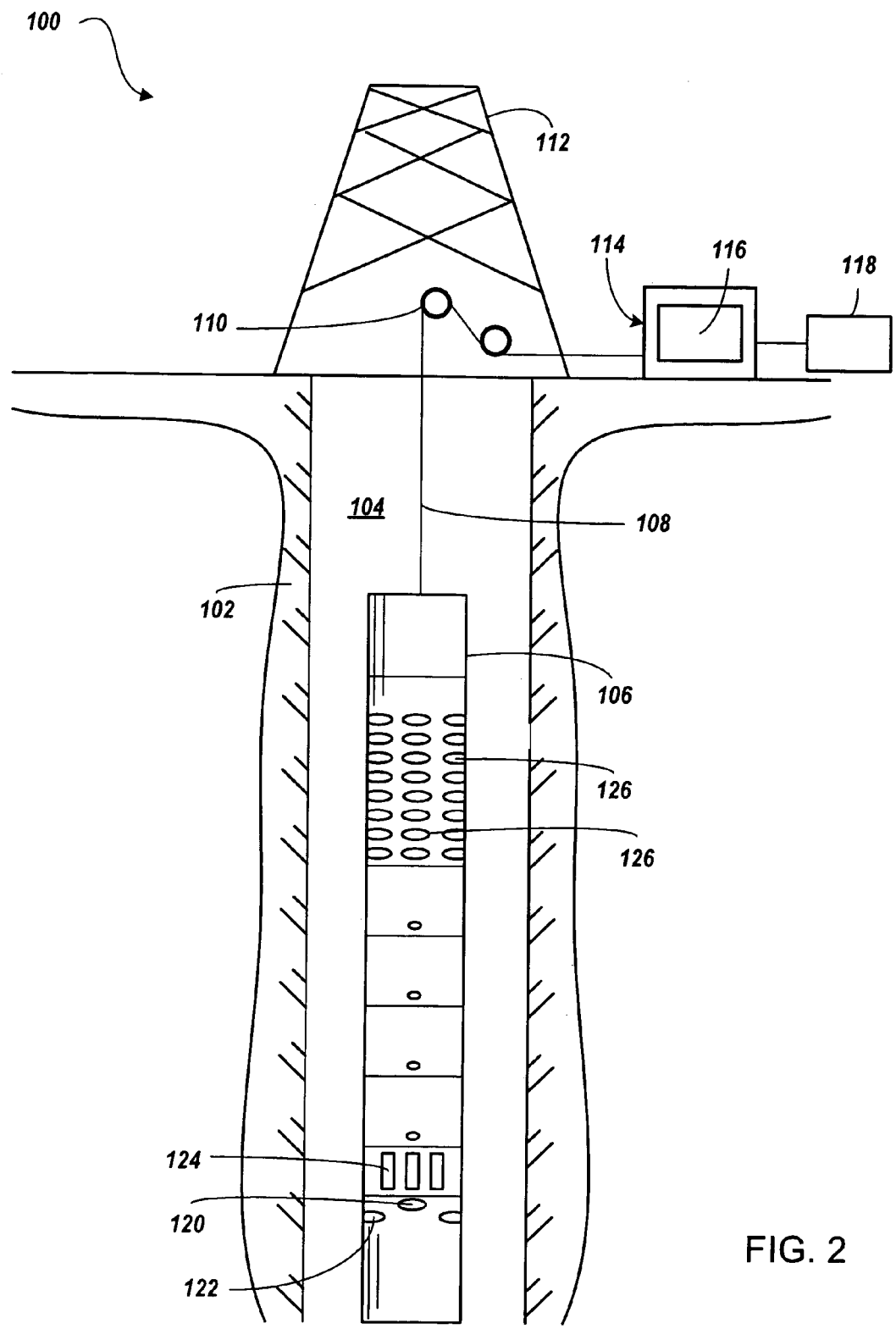
FIG. 2 is a diagram, partially in block form, of an apparatus that can be used to practice principles of the present invention.

Turning next to FIG. 2 a logging system 100 is shown that may be used according to embodiments of the invention. A subsurface formation 102 is traversed by a borehole 104 which may be filled with drilling fluid or mud. A logging tool 106 is suspended from an armored cable 108 and may have optional centralizers (not shown). The cable 108 extends from the borehole over a sheave wheel 110 on a derrick 112 to a winch forming part of surface equipment 114. Well known depth gauging equipment (not shown) may be provided to measure cable displacement over the sheave wheel 110. The tool 106 may include any of many well known or new devices to produce a signal indicating tool orientation. Processing and interface circuitry within the tool 106 amplifies, samples and digitizes the tool's information signals for transmission and communicates them to the surface equipment 114 via the cable 108. Electrical power and control signals for coordinating operation of the tool 106 are generated by the surface equipment 114 and communicated via the cable 108 to circuitry provided within the tool 106. The surface equipment includes a processor subsystem 116 (which may include a microprocessor, memory, clock and timing, and input/output functions—not separately shown), standard peripheral equipment (not separately shown), and a recorder 118.

The logging device 106 may be, for example, a Dipole Shear Sonic Imager ("DSI"—trademark of Schlumberger) generally described in Harrison et al., "Acquisition and Analysis of Sonic Waveforms From a Borehole Monopole and Dipole Source for the Determination of Compressional and Shear Speeds and Their Relation to Rock Mechanical Properties and Surface Seismic Data," Society of Petroleum Engineers, SPE 20557, 1990. It will be understood by those of skill in the art having the benefit of this disclosure, however, that any suitable logging device can be utilized, especially stronger, less flexible devices that are more robust in difficult logging conditions.

The logging tool 106 includes multi-pole transmitters such as crossed dipole transmitters 120, 122 (only one end of dipole 120 is visible in FIG. 2) and a monopole transmitter 124, capable of exciting compressional, shear, Stoneley, and flexural waves. A plurality of receivers is arranged on the logging tool spaced from the transmitters. For example, FIG.

Figure 3:
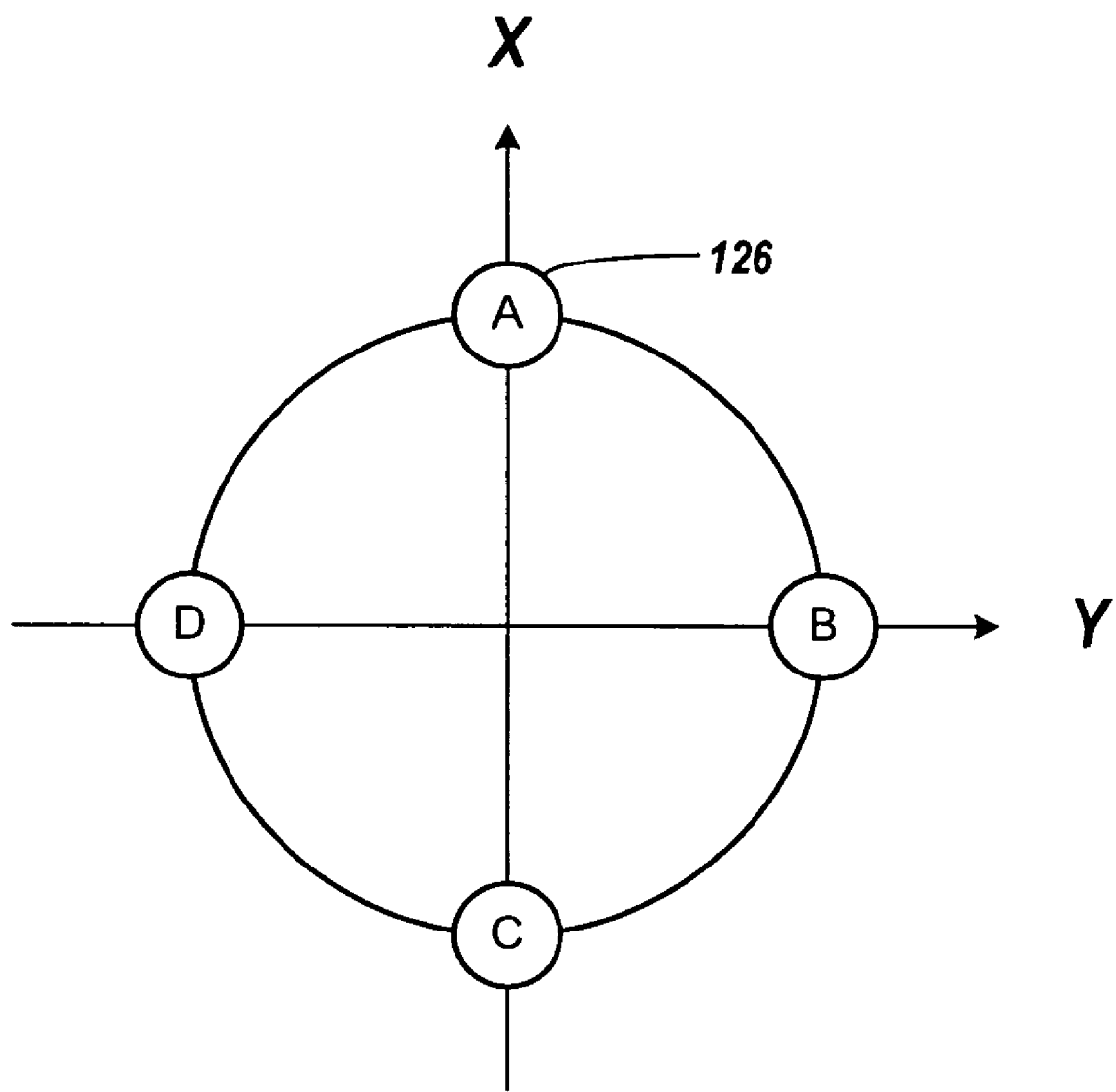
FIG. 3 is a cross sectional view of the tool illustrated in FIG. 2 showing the placement of hydrophones that can be used at a receiver station according to one embodiment of the present invention.

2 shows eight spaced receiver stations, each receiver station comprising multiple receiver hydrophones 126 mounted azimuthally at regular intervals around the circumference of the tool 106. According to some embodiments, there may be four receiver hydrophones 126 spaced at ninety degree intervals around the tool 106 as shown in FIG. 3. The four receiver hydrophones 126 are shown at locations A, B, C, and D. According to the embodiment of FIG. 3, in an X-Y plane, an X component of a received signal may be obtained by subtracting the signals received at A and C (i.e., A-C), and a Y component can be obtained by subtracting the signals received at B and D (i.e., B-D). With four receivers 126 at each receiver station as shown in FIG. 2, there are a total of thirty two receiver elements. The receiver stations are also configurable for monopole reception.

The transmitter electronics contain a power amplifier and switching circuitry capable of driving the two crossed-dipole transmitter elements and the monopole element from a programmable waveform. Separate waveforms with appropriate shape and frequency content can be used for dipole, Stoneley and compressional measurements. The receiver electronics processes the signals from the thirty-two individual receiver elements located at the eight receiver stations, which are spaced six inches apart. At each station, four receivers 126 are mounted as shown in FIG. 3 which allows measurement of the dipole and crossed-dipole waveforms by calculating the difference between outputs from opposite receivers, as previously described. A monopole signal can be produced by summing the outputs of the receivers 126. As further described in Harrison et al., supra, the receiver electronics multiplexes, filters, amplifies, and channels the signals from the thirty-two receiver elements to eight parallel signal paths. These eight parallel analog signals are passed to an acquisition electronics cartridge where eight 12-bit analog-to-digital converters digitize the signals from the receiver electronics. A telemetry circuit passes the digitized information to the earth's surface via the cable 108.

Figure 4:
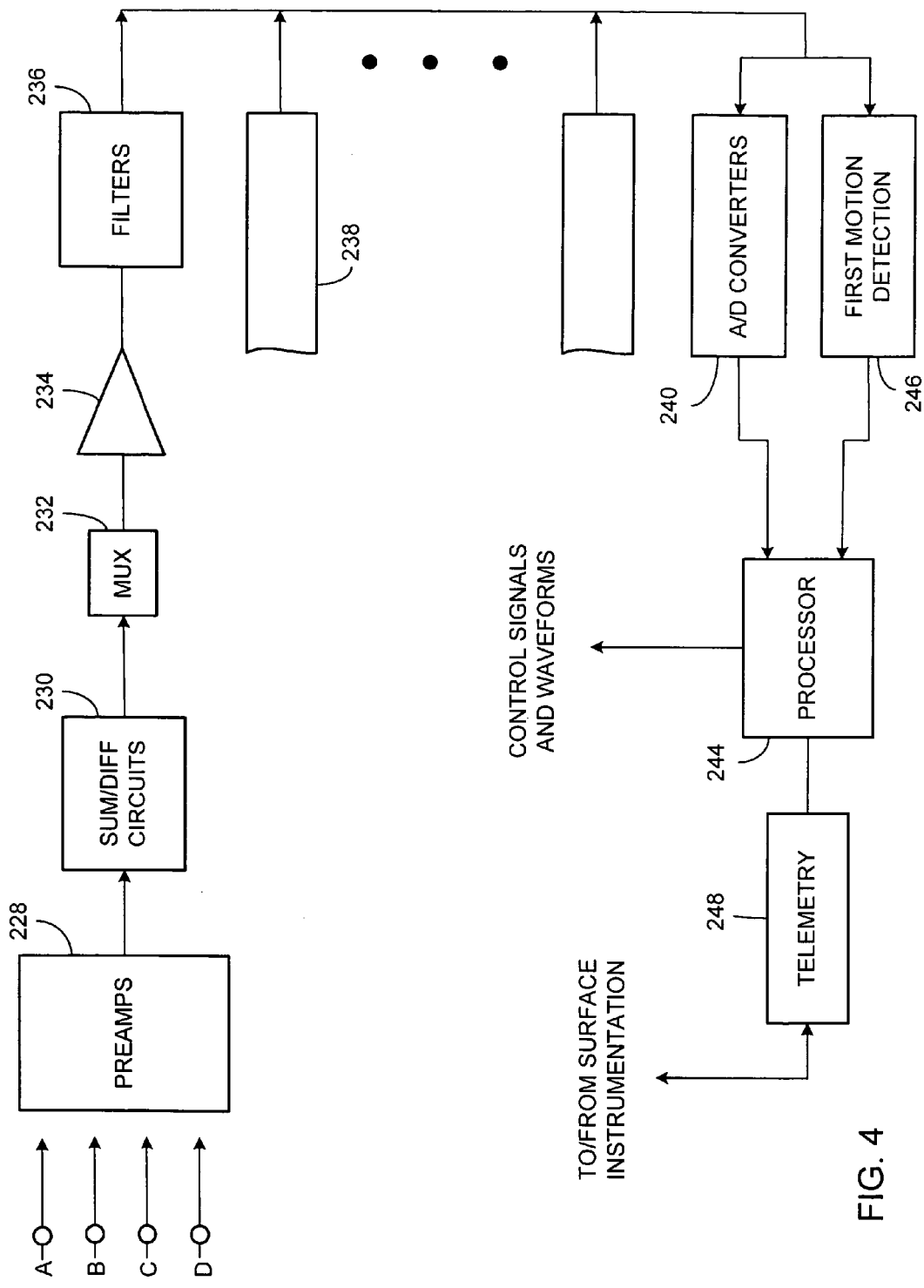
FIG. 4 is a block diagram of a portion of the electronics of the apparatus shown in FIG. 2.

FIG. 4 illustrates an example of an acquisition signal path in block diagram form for one of the eight (or other suitable number of) receiver stations, as described in Harrison et al., supra. Each receiver 126 (FIG. 2) has its own charge preamplifier (represented at 228). The odd numbered receiver pairs are aligned with the upper dipole transmitter 120 (FIG. 2), and even numbered receiver pairs are aligned with the lower dipole transmitter 122 (FIG. 2). The output of the receivers 126 (FIG. 1) passes into both a summing circuit (for monopole measurements) and a differencing circuit (for dipole measurements), as represented at 230. Under software control, the sum or difference is selected by a multiplexer stage 232 and the signal is passed to one of eight programmable gain amplifier stages 234 and filters 236. Other similar channels are represented by block 238. The eight parallel analog signals are passed to eight parallel 12-bit A/D converters 240, where simultaneous waveform digitization is performed. After the signals are digitized, the eight waveforms are passed to a memory module associated with a downhole processor 244. The processor 244 provides control signals and waveforms to the transmitter and receiver electronics. An alternate path directs the eight analog receiver signals into threshold crossing detection circuitry or digital first motion detection, as represented at block 246. This first motion detection circuitry detects the time of all up or down going threshold crossings. The digitized waveform data and the threshold crossing time data are passed to the surface using telemetry circuitry 248. One of ordinary skill in the art having the benefit of this disclosure will understand that more advanced tool implementations, including those with additional transmitters, receivers, and/or longer transmitter-to-receiver (T/R) spacings, and more powerful processing capabilities, can be used consistent with the principles described herein.

Figure 5:
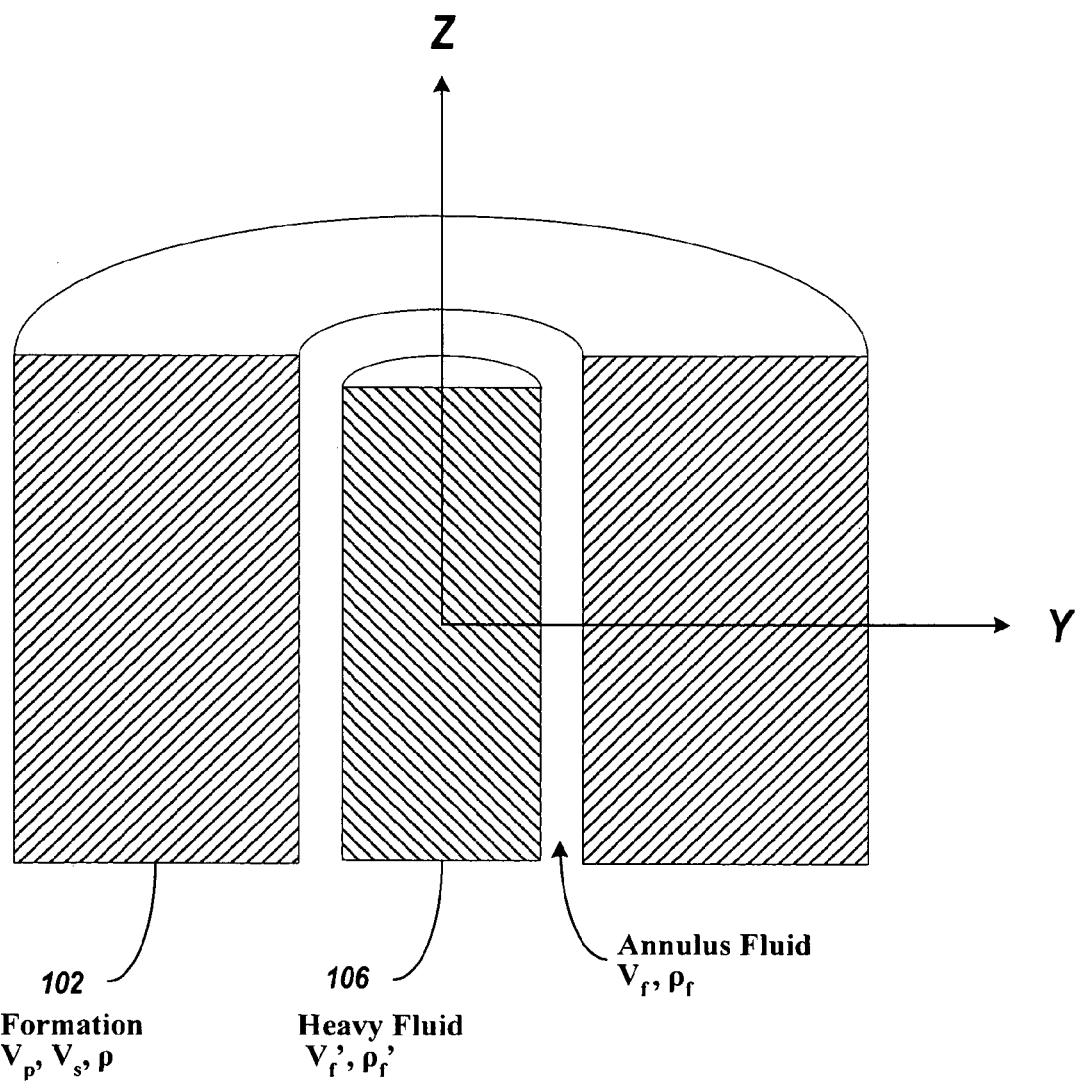
FIG. 5 is a schematic diagram of a heavy-fluid column used to simulate an acoustic tool structure in a borehole for describing the tool bias on measured Stoneley dispersion according to principles of the present invention.
Figure 6A:
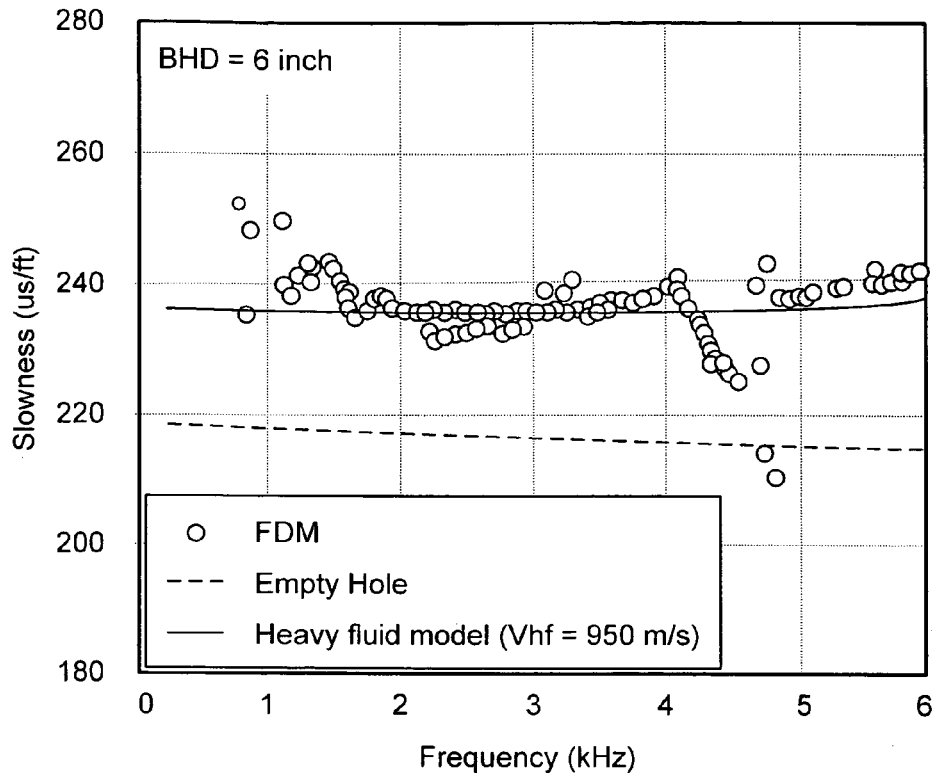
FIGS. 6A-6D illustrate a comparison of predictions of Stoneley dispersions for various formation parameters of a fast formation, using an empty borehole, a heavy-fluid, and a finite-difference model of a sonic tool.
Figure 6B:
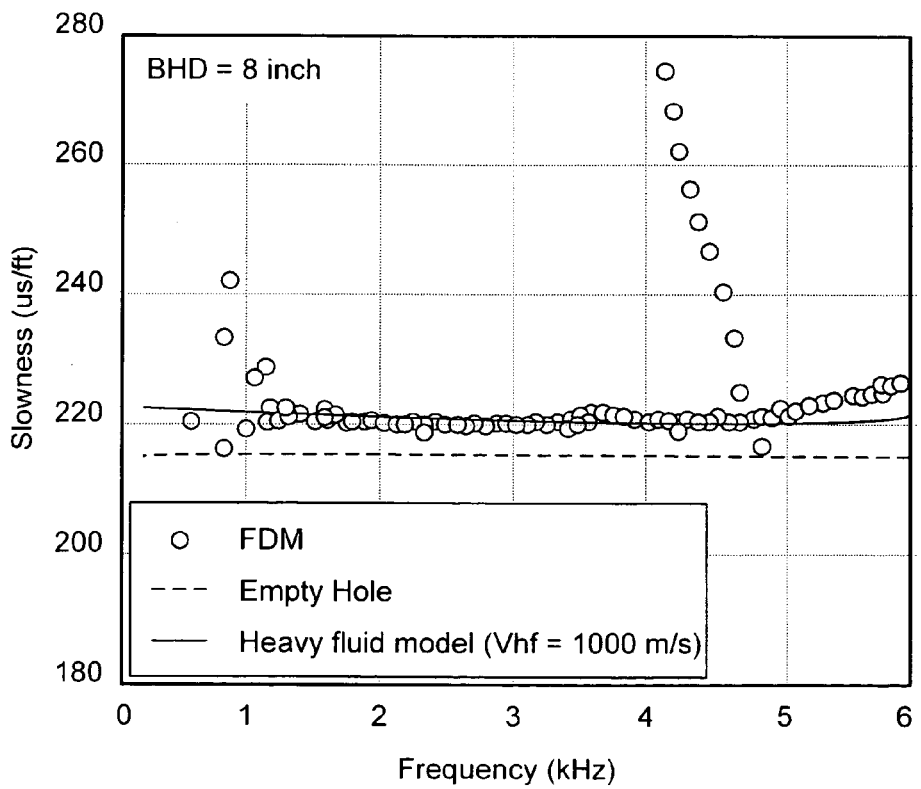
Figure 6C:
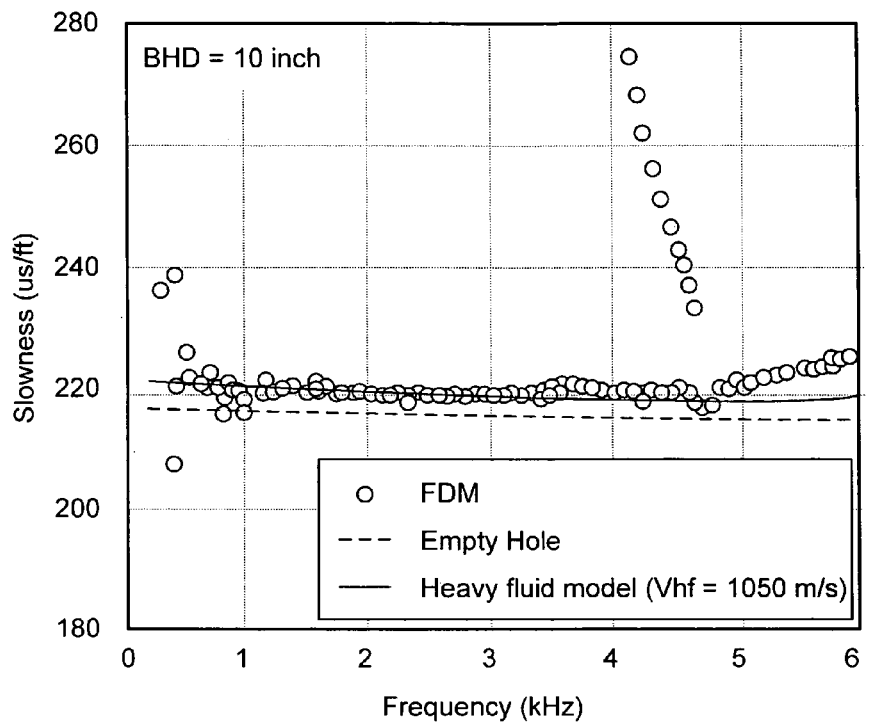
Figure 6D:
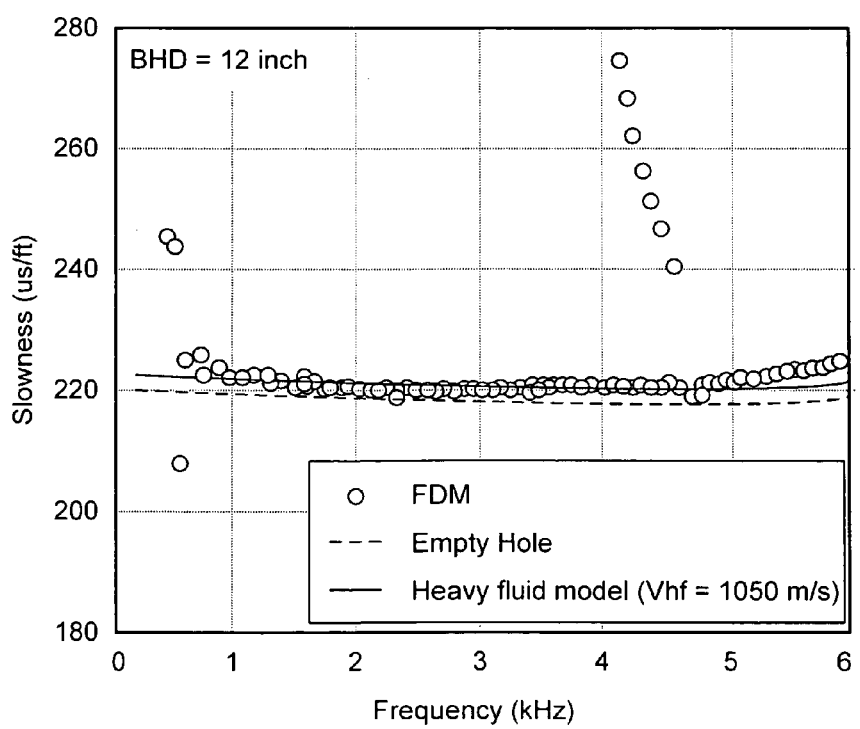
Figure 7A:
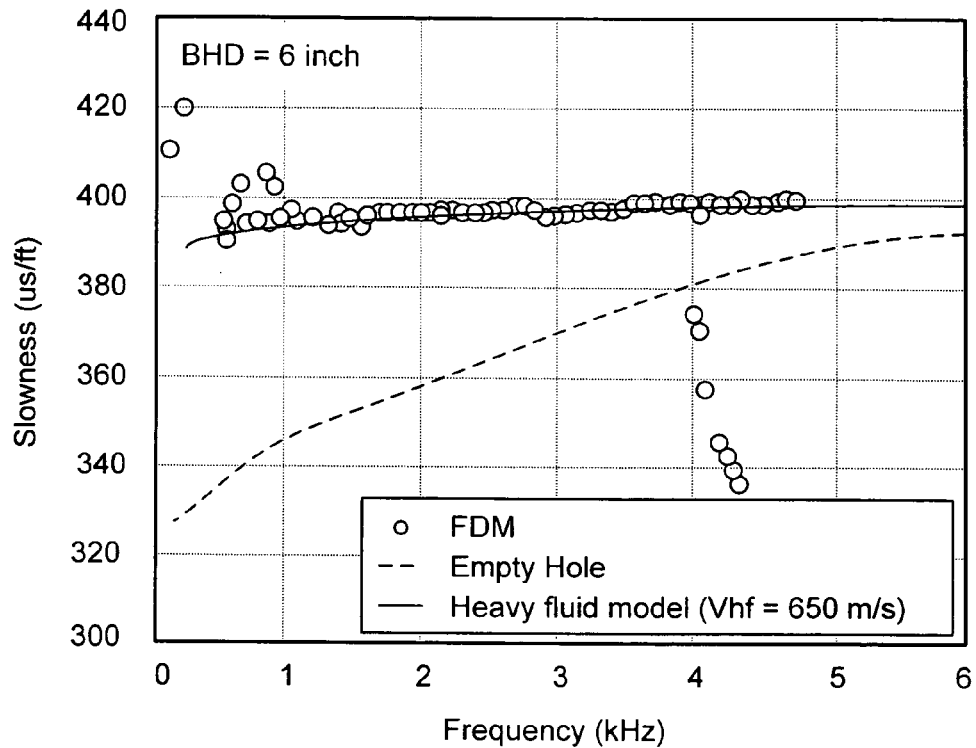
FIGS. 7A-7D illustrate a comparison of predictions of Stoneley dispersions for various formation parameters of a slow formation, using an empty borehole, a heavy-fluid, and a finite-difference model of a sonic tool.
Figure 7B:
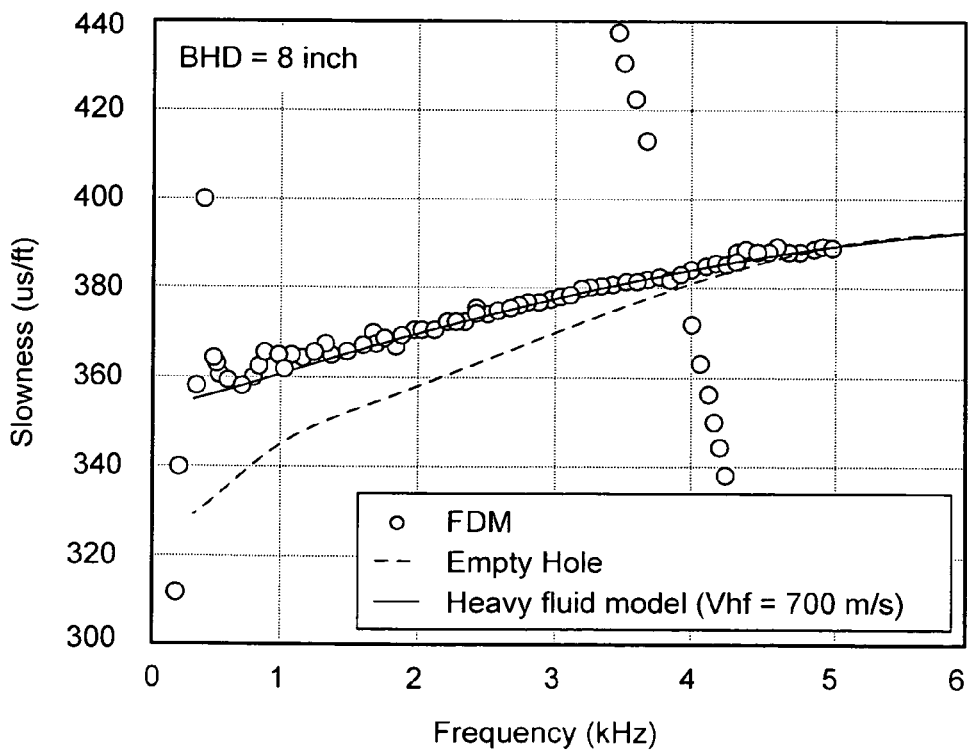
Figure 7C:
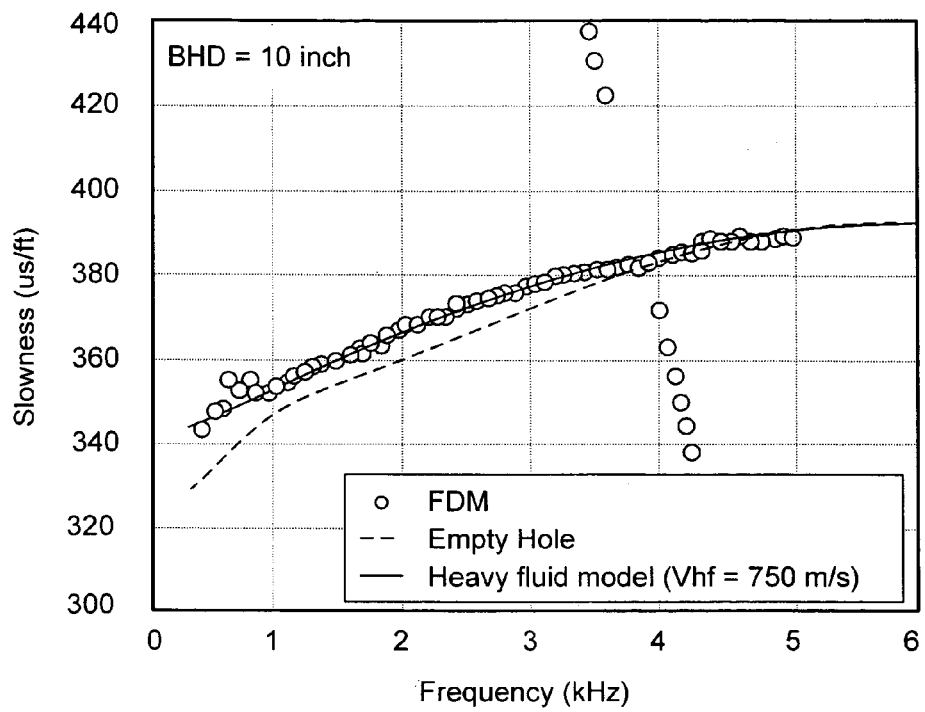
Figure 7D:
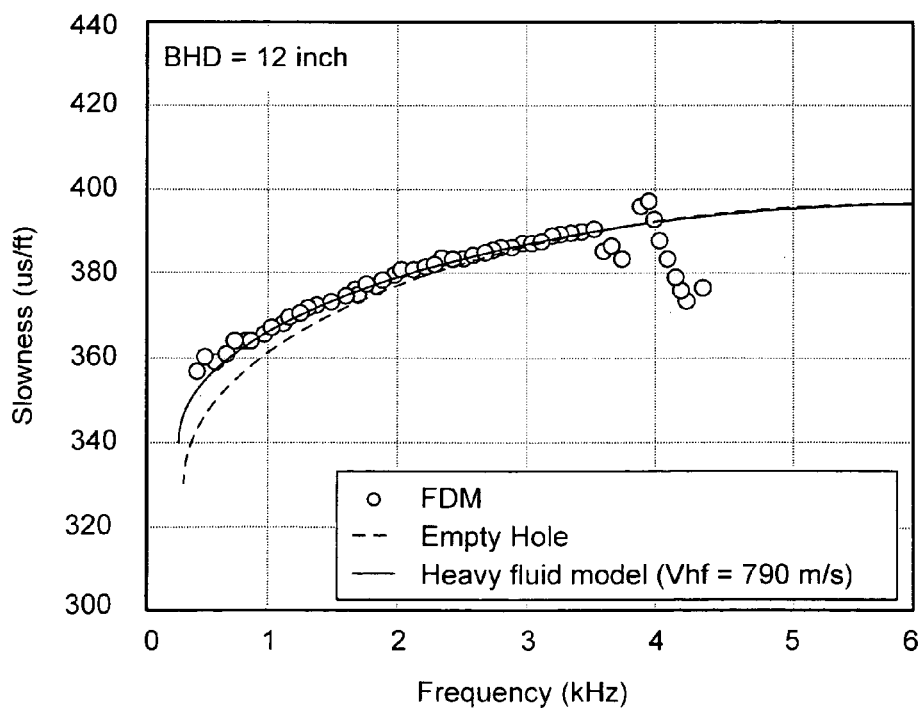

According to principles of the present invention, the sonic tool structure is replaced by a simple model, for example a heavy-fluid column model, to account for sonic tool bias. Detailed three-dimensional finite-difference modeling of the sonic tool structure effect on the borehole Stoneley dispersions in a variety of formations may be done to verify the accuracy of replacing of the sonic tool structure with a simple heavy-fluid column model. The heavy-fluid model parameters may be obtained by comparing predictions from the heavy-fluid model with those from a detailed finite-difference model for a range of borehole diameters and formation slownesses. FIG. 5 illustrates schematically modeling the logging tool 106 as a heavy-fluid. FIGS. 6A-6D and 7A-7D illustrate a comparison of predictions for the Stoneley dispersions for various formation parameters using an empty borehole model and a heavy-fluid with a variable velocity, $V_{hf}$, with that of a finite difference model of a sonic tool. FIGS. 6A-6D represents the results in a fast formation ($DT_c$=50 µs/ft, $DT_s$=95 µs/ft, various borehole diameters (BHD) and $V_{hf}$), and FIGS. 7A-7D represent the results in a slow formation ($DT_c$=130 µs/ft, $DT_s$=350 µs/ft, various borehole diameters (BHD) and $V_{hf}$).

Figure 9:
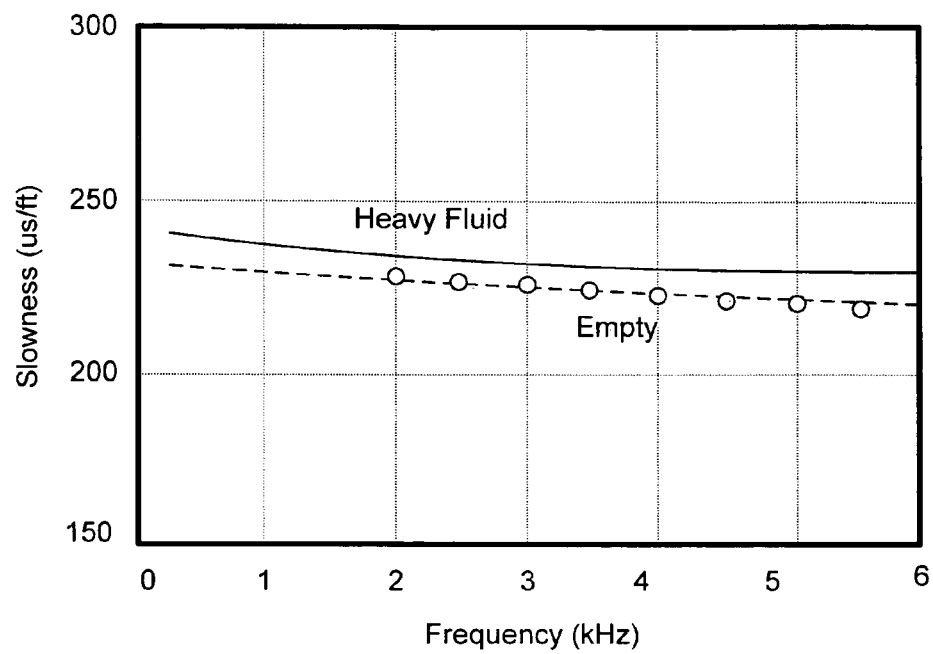
FIG. 9 illustrates a comparison of the Stoneley dispersions for a fluid-filled borehole in the absence of any tool (labeled "empty") with that of a heavy-fluid model to account for tool bias.
Figure 10:
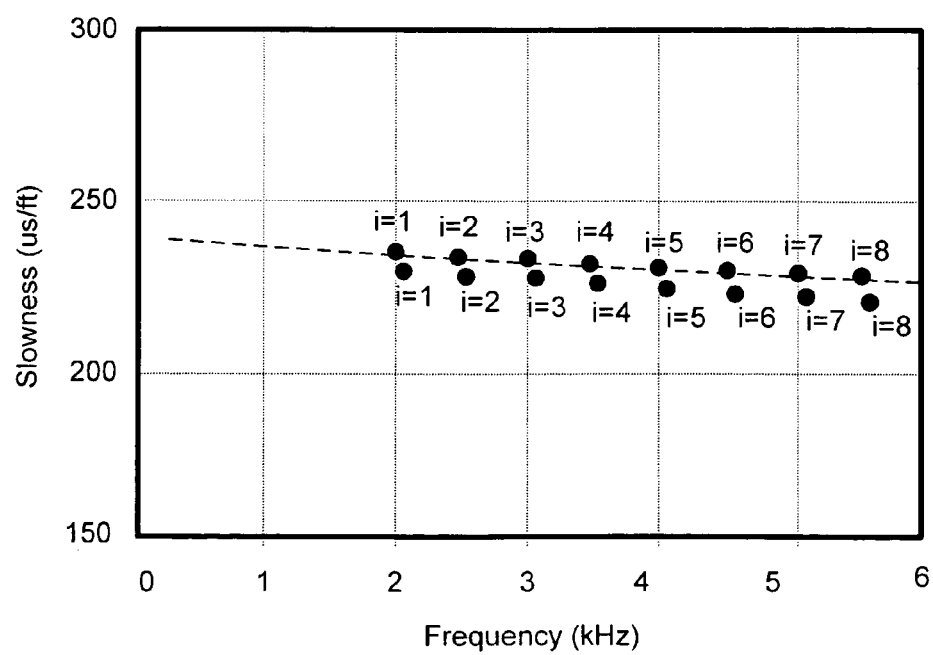
FIG. 10 illustrates a reference Stoneley dispersion using the heavy-fluid model to account for sonic tool presence according to principles of the present invention.
Figure 11:
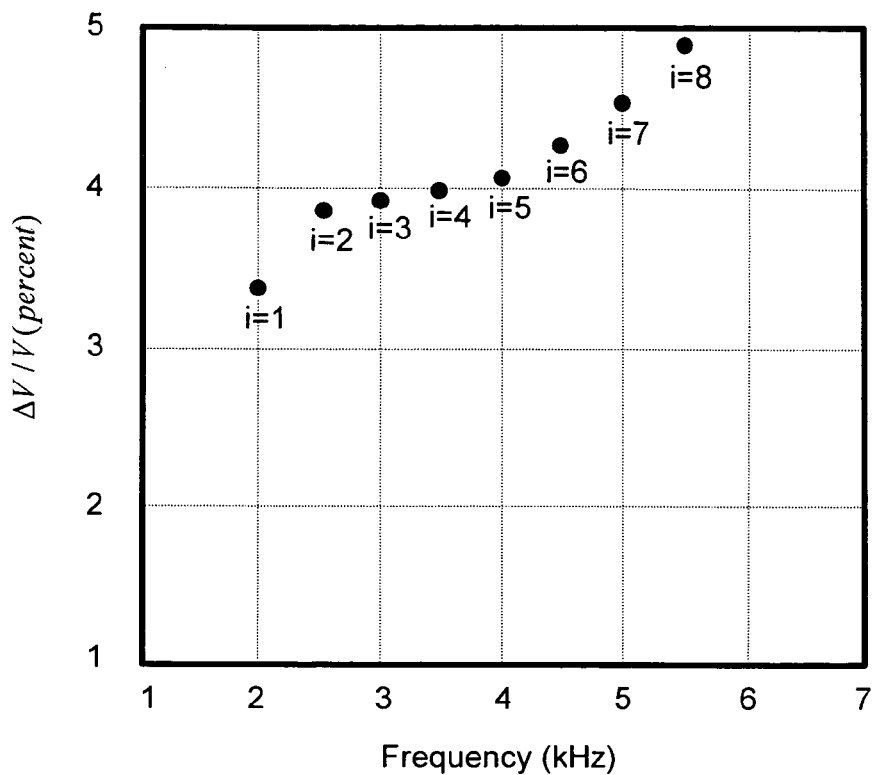
FIG. 11 illustrates fractional differences between measured and reference Stoneley velocities at eight selected frequencies.
Figure 12:
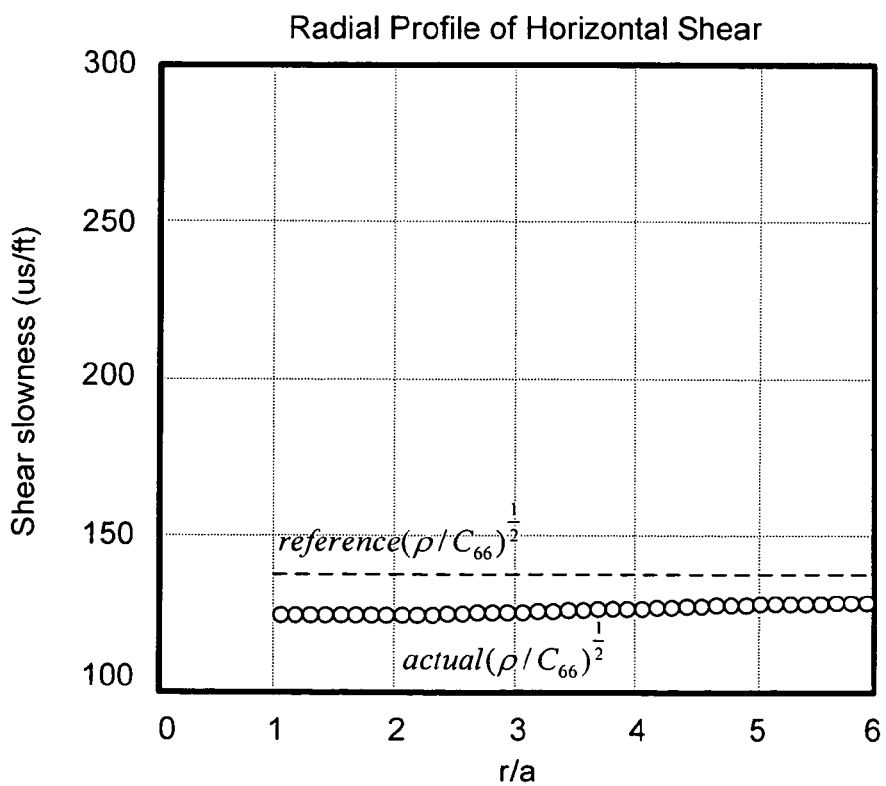
FIG. 12 is a radial profile of horizontal shear slowness illustrating reference shear slowness used to define the reference Stoneley dispersion in the presence of a heavy-fluid column.
Figure 13:
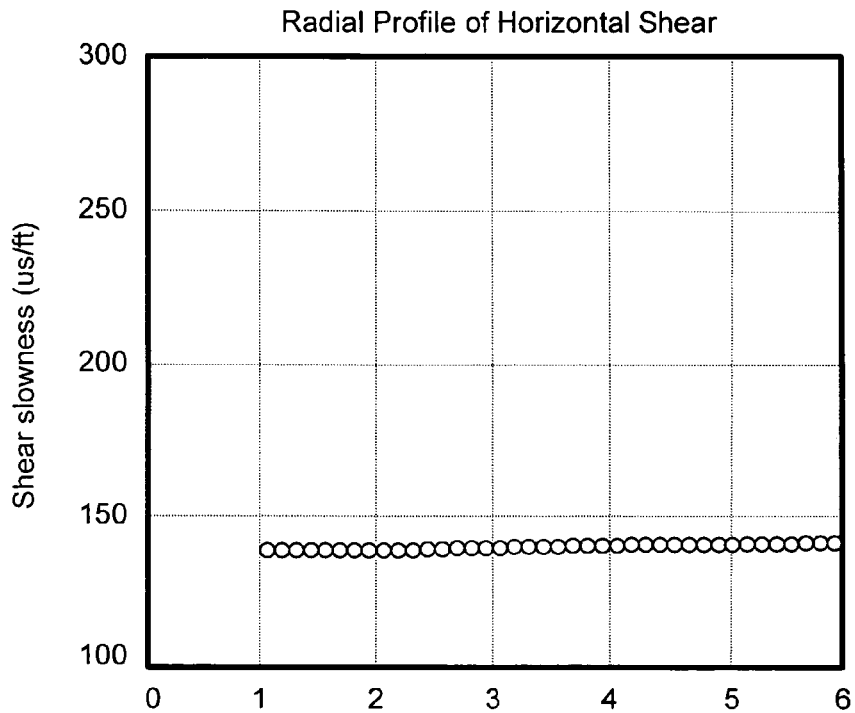
FIG. 13 is a radial profile of horizontal shear slowness using an empty borehole model that ignores the presence of tool structure.
Figure 14:
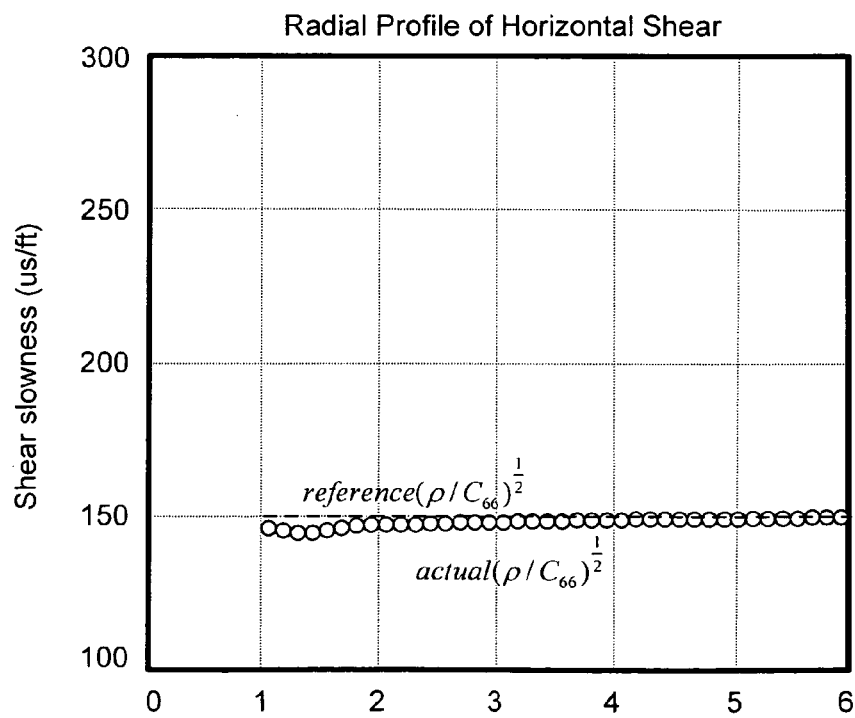
FIG. 14 is a radial profile of vertical shear slowness obtained from measured dipole dispersion at the same depth as that of FIG. 12.

The Backus-Gilbert technique for obtaining radial profiles of horizontal shear slowness or equivalently, horizontal shear modulus $c_{66}$ in an anisotropic formation with the vertical $X_3$-axis, comprises a perturbation model that relates corresponding changes in the Stoneley slowness dispersion caused by perturbations in formation properties. From measured Stoneley wave slownesses at a few discrete frequencies, one makes a reasonable initial guess of the formation parameters in the reference state. The initial parameters for an assumed homogeneous and equivalent isotropic formation, together with the heavy-fluid model for the sonic tool, yield the Stoneley dispersion in the reference state as shown by the dashed line in FIG. 10. The measured Stoneley slowness data is denoted at eight frequencies by discrete points in FIG. 10. The differences between the measured and reference slownesses at the axial wave numbers corresponding to each of the eight data points constitute the input to the B-G procedure. In addition, kernels are calculated from the reference Stoneley mode eigenfunctions that are required in the inversion technique. The sum of the inverted perturbation and the background profile yield the actual profile (see R. Burridge and B. Sinha, "Inversion For Formation Shear Modulus And Radial Depth Of Investigation Using Borehole Flexural Waves," $66^{th}$ Ann. Internat. Mtg., Soc. Expl. Geophys., Expanded Abstracts, 158-161, 1996). FIG. 9 illustrates a comparison of the Stoneley dispersions for a fluid-filled borehole in the absence of any tool (labeled "empty" and represented by the dashed line) with the Stoneley dispersions for a heavy-fluid model (solid line) to account for sonic tool bias. The open circles indicate the measured slownesses at eight frequencies in a shale interval. FIG. 12 shows the radial variation of inverted formation shear slowness from the eight slowness data points shown in FIG. 11.

The discussion below illustrates a procedure, according to principles of the present invention, for the detection and estimation of mechanical alteration caused by radial variations of horizontal shear slownesses or equivalently, the horizontal shear modulus $c_{66}$ in an anisotropic formation with the vertical $X_3$-axis, surrounding a borehole. One selects a depth interval of interest. Borehole diameter d is measured with, for example, a standard four or six-arm caliper. The annulus mud compressional velocity, $V_f$, is measured or estimated from the mud composition, mass density, in-situ pressure and temperature. Formation mass bulk density $\rho_b$ and mud mass density is measured or estimated from the drilling mud weight used in the depth interval of interest. The formation compressional velocity $V_P$ in the (far-field) region is determined, outside any mechanically altered annulus from a standard sonic log. An initial guess or estimate of formation shear modulus $c_{66}$ is made using the measured Stoneley velocity at the lowest frequency from the equation:

$$c_{66} = \frac{V_T^2 \rho_f V_f^2}{(V_f^2 - V_T^2)} \qquad (2)$$

where $V_T$ is the measured Stoneley velocity at the lowest measured frequency $f_1$; $\rho_f$ is the borehole fluid mass density; and $V_f$ is the borehole fluid compressional velocity.

A reference shear velocity $V_S$ for an equivalent isotropic formation is calculated using the equation:

$$V_S = \sqrt{\frac{c_{66}}{\rho_b}}. \qquad (3)$$

Figure 8:
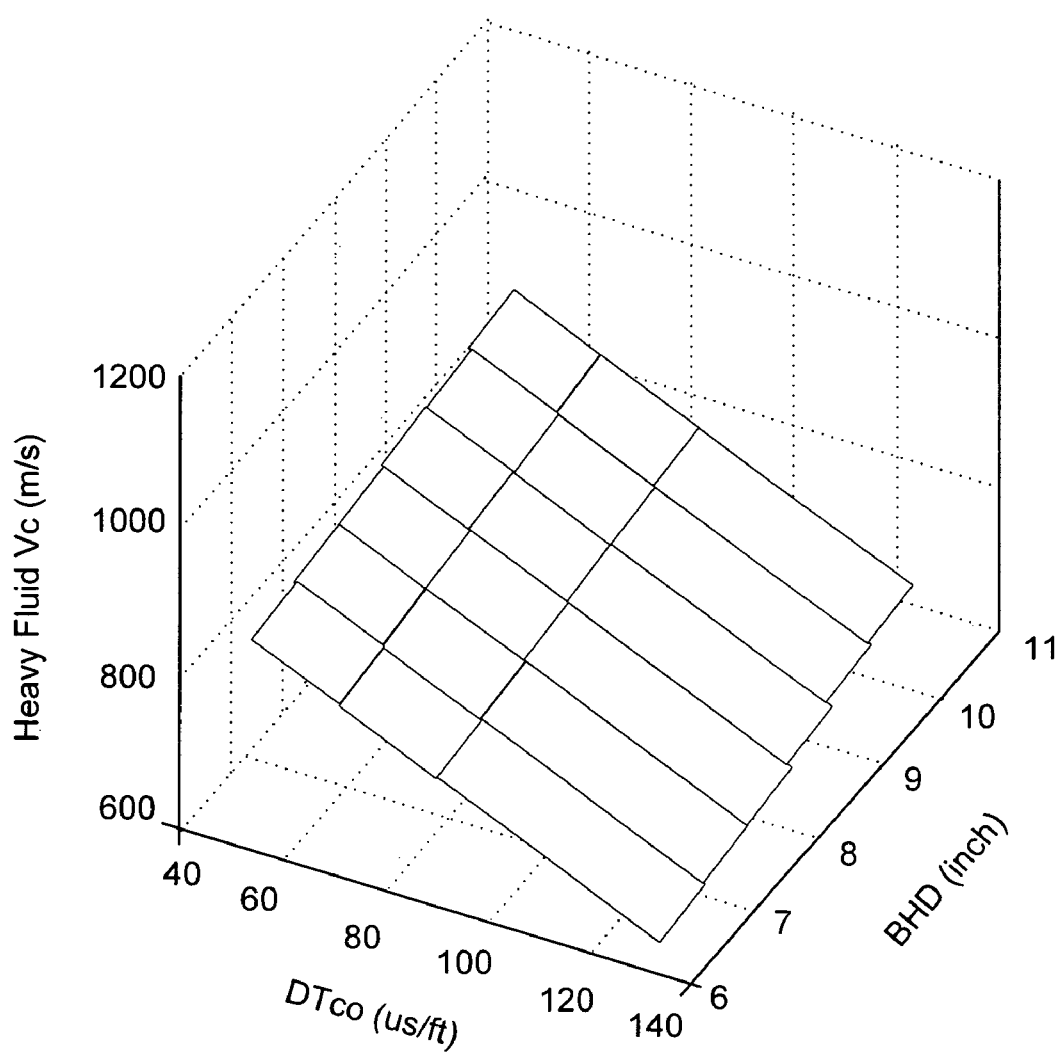
FIG. 8 illustrates a look-up take of heavy-fluid compressional velocity as a function of borehole diameter (BHD) and formation compressional slowness (DTco).

The heavy-fluid compressional velocity $V_{hf}$ is determined as a function of borehole diameter and formation compressional velocity $V_P$ from a "look-up" table (e.g. the look-up table illustrated in FIG. 8). A reference Stoneley dispersion and associated eigenfunctions are calculated for an assumed homogeneous and equivalent isotropic formation with the five parameters obtained from the previous steps, together with the three heavy-fluid column parameters $d_{hf}$, $\rho_{hf}$ and $V_{hf}$. The five borehole and formation parameters are d, $V_f$, $V_P$, $V_S$, and $\rho_b/\rho_f$. A procedure is described, for example, in C. J. Hsu and B. K. Sinha, "Mandrel effects on the dipole flexural mode in a borehole," (Journal of Acoustical Society of America, volume 104(4), pp. 2025-2039, October 1998) for obtaining the borehole Stoneley dispersion and associated eigenfunctions in the presence of a multi-layer cylindrical structure such as that shown in FIG. 5. The described procedures or others known to those of skill in the art having the benefit of this disclosure may be used. The measured Stoneley dispersion at a chosen depth is compared with the reference Stoneley dispersion calculated above. A exemplary procedure is described in M. P. Ekstrom, "Dispersion estimation from borehole acoustic arrays using a modified matrix pencil algorithm," (presented at the 29th Asilomar Conference on Signals, Systems, and Computers, 1995) for determining the measured borehole Stoneley dispersion from recorded monopole waveforms at an array of receivers placed in a fluid-filled borehole. Other procedures known to those of skill in the art may also be used. Any observed difference between the measured and reference borehole Stoneley dispersions is a potential indicator of radial variation of formation properties. In the presence of a difference between the measured and reference borehole Stoneley dispersions, a number of Stoneley velocity data at several frequencies from the measured Stoneley dispersion is selected. The Stoneley velocity data is preferably sufficiently separated in frequency to ensure that each is uncorrelated. A frequency separation of approximately 200 Hz is generally adequate. Corresponding axial wave numbers $k_i$ are calculated by:

$$k_i = \frac{2\pi f_i}{V_i} \qquad (4)$$

where $V_i$ is the measured Stoneley velocity at frequency $f_i$.

Fractional changes in the measured Stoneley velocities from those in the reference dispersion calculated above for selected axial wave numbers obtained from equation (4) are calculated. A fractional change in the Stoneley velocity is given by:

$$\frac{\Delta V_i}{V_i} = \frac{(V_i^{measured} - V_i^{reference})}{V_i^{reference}} \qquad (5)$$

where i=1, 2, ..., n, and n denotes the number of axial wavenumbers calculated according to equation (4).

The kernel $G_i(r)$ at a selected wave number $k_i$ is calculated in terms of the Stoneley wave eigenfunction in the reference state defined above. The borehole axis is assumed to be parallel to the $X_3$-axis. The kernel $G_i(r)$ relates a fractional change in the Stoneley velocity at a given axial wavenumber $k_i$ from that in the isotropic, homogeneous reference state to a corresponding fractional change in the horizontal shear modulus $c_{66}$:

$$\frac{\Delta V_i}{V_i} = \int_a^\infty G_i \frac{\Delta c_{66}(r)}{c_{66}} r dr, \qquad (6)$$

where a=d/2, is the borehole radius, and i=1, 2, ..., n.

A description of a procedure for determining the kernel $G_i$ is given by B. K. Sinha, in "Sensitivity and inversion of borehole flexural dispersions for formation parameters," (Geophysical Journal International, vol. 128(1), pp. 84-96, January 1997; C. J. Hsu and B. K. Sinha, "Mandrel effects on the dipole flexural mode in a borehole", Journal of Acoustical Society of America, volume 104(4), pp. 2025-2039, October 1998) and is known to those of skill in the art having the benefit of this disclosure.

The integrals below are calculated according to:

$$u_i = \int_a^\infty G_i(r) dr, \qquad (7)$$

$$S_{ij}(r_0) = \int_a^\infty (r - r_0)^2 G_i(r) G_j(r) dr, \qquad (8)$$

where $r_o$ denotes the radial position in the formation; i,j=1, 2, ..., n, and a is the borehole radius.

$$a_i(r_o) = \frac{S_{ij}^{-1}(r_o) u_j}{u_i S_{ij}^{-1}(r_o) u_j}. \qquad (9)$$

where $a_i$ is the weighting coefficient of the data kernel $G_i(r)$, and $u_i$ is the integral of the data kernel $G_i(r)$ as shown above and denotes the sensitivity of the measured shear velocity $V_i^{measured}$ to radial variations in the shear modulus $c_{66}$.

A fractional change in the horizontal shear modulus $c_{66}$ can then be calculated from the relation:

$$\frac{\Delta c_{66}(r_0)}{c_{66}} = a_i(r_0)\frac{\Delta V_i}{V_i}, \quad (10)$$

where $\Delta V_i/V_i$ are known at selected axial wavenumbers $k_i$, from equation (4).

Radial variation in the formation horizontal shear modulus can then be calculated from the relation:

$$c_{66}(r_0) = \left(1 + \frac{\Delta c_{66}(r_0)}{c_{66}}\right)c_{66}, \quad (11)$$

Radial variation in the formation horizontal shear velocity $V_{hs}$ is then calculated from:

$$V_{hs}(r_0) = \left[\left(1 + \frac{\Delta c_{66}(r_0)}{c_{66}}\right)\frac{c_{66}}{\rho_b}\right]^{\frac{1}{2}}, \quad (12)$$

Following Backus and Gilbert inverse theory (Burridge and Sinha, "Inversion for formation shear modulus and radial depth of investigation using borehole flexural waves", 66th Annual International Meeting, Society of Exploration Geophysicists Expanded Abstracts, pp. 158-161, 1996) known to those of skill in the art having the benefit of this disclosure, a trade-off between the error e, defined by equation (15) (below); and radial spread S, defined by equation (14) (below), in the inverted shear modulus can be expressed in terms of α and the new spread function. W can then be expressed as:

$$W_{ij}(\alpha, r_o) = E_{ij} + \alpha S_{ij}(r_o),$$

where $$a_i(\alpha, r_0) = \frac{W_{ij}^{-1}(r_0)u_i}{u_i W_{ij}^{-1}(r_0)u_i} \quad (13)$$

$$s(\alpha, r_0) = a_i(\alpha, r_0)S_{ij}(r_0)a_j(\alpha, r_0), \quad (14)$$

$$e^2 = a_i(\alpha, r_0)E_{ij}a_j(\alpha, r_0). \quad (15)$$

In the presence of error in the measured Stoneley velocity at various axial wavenumbers $k_i$, expressed in terms of the error covariance matrix $E_{ij}$, and an assumed value of the trade-off parameter α, one can use the spread function $W_{ij}$ instead of $S_{ij}(r_o)$, and follow the same method described above for estimating the radial variation in the formation horizontal shear velocity.

Accordingly a procedure is described below in accordance with principles of the invention. A depth interval of reasonably uniform lithology is selected. The borehole diameter, d, is measured, for example with a caliper tool. The borehole fluid (e.g. mud) compressional velocity, $V_f$, is measured, or it may be estimated from the mud composition, mass density, in-situ pressure and temperature. The formation mass bulk density, $\rho_b$, and the mud mass density, $\rho_f$, are measured or estimated, according to well-known techniques. The formation mass bulk density may be obtained from neutron-density logging measurements, and the mud mass density can be derived using mud weight information from the drilling fluid supplier.

The compressional velocity $V_p$ of a substantially undisturbed formation (that is, the relatively far-field region outside any mechanically altered annulus) is obtained, for example, from a standard sonic log (see, e.g. Harrison et al., "Acquisition and Analysis of Sonic Waveforms From a Borehole Monopole and Dipole Source for the Determination of Compressional and Shear Speeds and Their Relation to Rock Mechanical Properties and Surface Seismic Data,'" Society of Petroleum Engineers, SPE 20557, 1990). The reference shear velocity $V_S$ for an equivalent isotropic formation may be obtained from equation (3).

Up to this point, the parameters d, $V_f$, $\rho_f$, $\rho_b$, $V_p$ and $V_s$ have been obtained (measured and/or derived and input). Therefore, a reference Stoneley dispersion for a reference formation that is assumed to be homogeneous and isotropic may be computed using these formation parameters and selected heavy-fluid parameters to account for the tool presence applying known techniques. Reference can be made, for example, to B. K. Sinha, "Sensitivity and Inversion of Borehole Flexural Dispersions for Formation Parameters", Geophysical Journal international, Vol. 128(1), pp. 84-96, January 1997.

As above described, a sonic logging device is utilized to establish Stoneley waves in the formation, and Stoneley wave velocity is determined at a number of frequencies to develop a measured dispersion curve at each depth level of interest. A known technique can be employed, for example as described in M. P. Ekstrom, "Dispersion Estimation From Borehole Acoustic Arrays Using A Modified Matrix Pencil Algorithm", presented at the $29^{th}$ Asilomar Conference on Signals, Systems, and Computers, 1995. At the depth level being processed, the measured Stoneley dispersion is compared with the previously computed reference Stoneley dispersion. Any observed difference (for example, greater than four percent) between the measured and reference borehole Stoneley dispersions is an indicator of radially varying formation properties. The uncertainty in the measured Stoneley dispersion may range from about two to four percent (see e.g. G. Backus and F. Gilbert, Uniqueness In The Inversion Of Inaccurate Gross Earth Data; Phil. Trans. Roy. Soc. (London), A266, 123-192, 1970).

In the presence of a difference between the measured and reference borehole Stoneley dispersions, a number of Stoneley velocity data at several frequencies are selected from the measured Stoneley dispersion. These velocity data should preferably be sufficiently separated in frequency so that they are uncorrelated. A frequency separation of about 200 Hz is generally found to be adequate. Following the methodology described above, one can obtain the radial profile of the horizontal shear slowness, or equivalently, the radial profile of the horizontal shear modulus $c_{66}$, from the Stoneley data in a borehole parallel to the $X_3$-axis accounting for and/or removing tool bias. However, according to the principles described herein, an acoustic tool effects model is appropriately embedded into an appropriate point in the inversion algorithm so that the inversion produces the appropriate answer product result (e.g. Stoneley permeability) in a way that is not biased by the presence of a non-transparent tool in the borehole. In this way, tool bias or effects are "removed" from the data processing method.

The preceding description has been presented only to illustrate and describe the invention and some examples of its implementation. It is not intended to be exhaustive or to limit the invention to any precise form disclosed. Other types of effective tool models may be used, such as those described in commonly-owned and concurrently-filed U.S. patent application Ser. No. 11/125,564, entitled "Use of an Effective Tool Model in Sonic Logging Data Processing", incorporated herein by reference. Many modifications and variations are possible in light of the above teaching. The principles described herein may be used for radial profiling, particularly Stoneley radial profiling of horizontal shear slowness.

The preceding description is also intended to enable others skilled in the art to best utilize the invention in various embodiments and aspects and with various modifications as are suited to the particular use contemplated. It is intended that the scope of the invention be defined by the following claims.

What is claimed is:

1. A method of estimating horizontal shear modulus $c_{66}$ in an anisotropic formation with a vertical $X_3$-axis surrounding a borehole, comprising:
   measuring Stoneley dispersion with an acoustic tool; and
   calculating a horizontal shear modulus $c_{66}$ from the measured Stoneley dispersion using a process that accounts for both the presence of the acoustic tool in the borehole and near-wellbore alteration effects, the process including:
      attributing heavy-fluid column properties to the tool;
      determining far-field formation compressional velocity;
      estimating formation shear modulus $c_{66}$ using measured Stoneley velocity;
      calculating a reference shear velocity for an equivalent isotropic formation;
      determining heavy-fluid compressional velocity as a function of formation compressional velocity;
      calculating a reference Stoneley dispersion and associated eigenfunctions for an assumed homogeneous and equivalent isotropic formation;
      determining Stoneley wave velocity at a plurality of frequencies at each depth level of interest;
      creating measured Stoneley dispersion data at each depth level of interest;
      comparing measured Stoneley dispersion at a selected depth with the reference Stoneley dispersion;
      if a difference exists between the measured and reference Stoneley dispersions, selecting a plurality of Stoneley velocity data sets at the plurality of frequencies from the measured Stoneley dispersion; and
      calculating the radial profile of the horizontal shear modulus $c_{66}$ from the measured Stoneley dispersion data.

2. A method of estimating horizontal shear modulus $c_{66}$ of a formation surrounding a borehole according to claim 1, wherein the process that accounts for the presence of the acoustic tool comprises modeling the acoustic tool as a heavy-fluid.

3. A method of estimating horizontal shear modulus $c_{66}$ of a formation surrounding a borehole according to claim 2, wherein the heavy-fluid model comprises a generally cylindrical shape.

4. A method of estimating horizontal shear modulus $c_{66}$ of a formation surrounding a borehole according to claim 2, wherein the modeling of the acoustic tool as a heavy-fluid comprises determining heavy-fluid compressional velocity as a function of borehole diameter and formation compressional velocity using a look-up table.

5. A method of estimating effective shear modulus $C_{66}$ in a cross-sectional plane of a deviated borehole in an anisotropic formation with a known deviation with respect to a vertical $X_3$-axis, comprising:
   measuring Stoneley dispersion in a deviated borehole with an acoustic tool;
   calculating an effective shear modulus $c_{66}$ in the cross-sectional plane of the borehole from the measured Stoneley dispersion using a process that accounts for both the presence of the acoustic tool in the borehole and near-wellbore alteration effects, the process including:
      attributing heavy-fluid column properties to the tool;
      determining far-field formation compressional velocity;
      estimating formation shear modulus $C_{66}$ using measured Stoneley velocity;
      calculating a reference shear velocity for an equivalent isotropic formation;
      determining heavy-fluid compressional velocity as a function of formation compressional velocity;
      calculating a reference Stoneley dispersion and associated eigenfunctions for an assumed homogeneous and equivalent isotropic formation;
      determining Stoneley wave velocity at a plurality of frequencies at each depth level of interest;
      creating measured Stoneley dispersion data at each depth level of interest;
      comparing measured Stoneley dispersion at a selected depth with the reference Stoneley dispersion;
      if a difference exists between the measured and reference Stoneley dispersions, selecting a plurality of Stoneley velocity data sets at the plurality of frequencies from the measured Stoneley dispersion; and
      calculating the radial profile of the shear modulus $C_{66}$ from the measured Stoneley dispersion data.

6. A method of estimating effective shear modulus $C_{66}$ in a cross-sectional plane of a horizontal borehole in an anisotropic formation with the borehole deviation substantially perpendicular to the vertical $X_3$-axis, comprising:
   measuring Stoneley dispersion in a horizontal borehole with an acoustic tool;
   calculating an effective shear modulus $C_{66}$ in the cross-sectional plane of the borehole from the measured Stoneley dispersion using a process that accounts for both the presence of the acoustic tool in the borehole and near-wellbore alteration effects, the process including:
      attributing heavy-fluid column properties to the tool;
      determining far-field formation compressional velocity;
      estimating formation shear modulus $C_{66}$ using measured Stoneley velocity;
      calculating a reference shear velocity for an equivalent isotropic formation;
      determining heavy-fluid compressional velocity as a function of formation compressional velocity;
      calculating a reference Stoneley dispersion and associated eigenfunctions for an assumed homogeneous and equivalent isotropic formation;
      determining Stoneley wave velocity at a plurality of frequencies at each depth level of interest;
      creating measured Stoneley dispersion data at each depth level of interest;
      comparing measured Stoneley dispersion at a selected depth with the reference Stoneley dispersion;
      if a difference exists between the measured and reference Stoneley dispersions, selecting a plurality of Stoneley velocity data sets at the plurality of frequencies from the measured Stoneley dispersion; and
      calculating the radial profile of the shear modulus $c_{66}$ from the measured Stoneley dispersion data.

* * * * *